(12) United States Patent
Pelot et al.

(10) Patent No.: US 11,414,352 B2
(45) Date of Patent: Aug. 16, 2022

(54) METHOD FOR MAKING A LIGHTWEIGHT GYPSUM COMPOSITION WITH INTERNALLY GENERATED FOAM AND PRODUCTS MADE FROM SAME

(71) Applicant: UNITED STATES GYPSUM COMPANY, Chicago, IL (US)

(72) Inventors: David D. Pelot, Chicago, IL (US); Samar Emami, Chicago, IL (US); Robert H. Negri, Lake Villa, IL (US); Juan Carlos Ruiz Castaneda, Nuevo Leon (MX); Christopher R. Nelson, Lindenhurst, IL (US); John J. Roxburgh, Chicago, IL (US); Edgar R. De La Rosa Cruz, San Pedro Cholula (MX); Jorge A. Garcia Torres, San Pedro Cholula (MX); Miguel Gama Goicochea, Campestre Churubusco (MX); Antonio Contreras, Aurora, IL (US); Juan Huitzil, San Miguelito (MX)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 724 days.

(21) Appl. No.: 16/292,988

(22) Filed: Mar. 5, 2019

(65) Prior Publication Data

US 2019/0315659 A1    Oct. 17, 2019

Related U.S. Application Data

(60) Provisional application No. 62/656,115, filed on Apr. 11, 2018.

(51) Int. Cl.
*C04B 28/14* (2006.01)
*C04B 24/04* (2006.01)
(Continued)

(52) U.S. Cl.
CPC ............ *C04B 28/14* (2013.01); *C04B 18/027* (2013.01); *C04B 22/064* (2013.01);
(Continued)

(58) Field of Classification Search
None
See application file for complete search history.

(56) References Cited

U.S. PATENT DOCUMENTS

| 1,748,614 A | 2/1930 | Nelson |
| 1,901,057 A | 3/1933 | Roos |

(Continued)

FOREIGN PATENT DOCUMENTS

| AT | 9511 U1 | 11/2007 |
| BE | 419013 A | 12/1936 |

(Continued)

OTHER PUBLICATIONS

International Search Report and Written Opinion dated Aug. 26, 2019 for PCT/US2019/026475 to United States Gypsum Company filed Apr. 9, 2019.

(Continued)

*Primary Examiner* — John J Figueroa
(74) *Attorney, Agent, or Firm* — Vorys, Sater, Seymour and Pease LLP; Philip T. Petti; Pradip K. Sahu

(57) ABSTRACT

Method of making foamed gypsum slurry having 15 to 90 volume percent gas bubbles including: passing first slurry including water and on dry basis 50 to 98 wt. % calcium sulfate hemihydrate, 1 to 50 wt. % calcium carbonate, and 0.1 to 10 wt. % cellulose thickener via a first hose to a Wye connector conduit first inlet opening at Rate C and passing alum solution via a second hose to a second inlet opening of the conduit at Rate D to create combined mixed stream passing from the conduit to a static mixer for mixing for Time 3 to activate at least a portion of the calcium carbonate (Continued)

and alum to generate CO₂ and create the foamed gypsum slurry; transferring the slurry from the mixer to a cavity between two wall boards via a third hose. Allowing the slurry in the cavity to expand, harden and dry.

19 Claims, 7 Drawing Sheets

(51) Int. Cl.

| | |
|---|---|
| *C04B 24/26* | (2006.01) |
| *C04B 24/12* | (2006.01) |
| *C04B 22/06* | (2006.01) |
| *C04B 22/16* | (2006.01) |
| *C04B 22/14* | (2006.01) |
| *C04B 18/02* | (2006.01) |
| *C04B 38/02* | (2006.01) |
| *C04B 40/00* | (2006.01) |
| *C04B 24/38* | (2006.01) |
| C04B 111/00 | (2006.01) |
| C04B 103/44 | (2006.01) |
| C04B 111/40 | (2006.01) |
| C04B 103/10 | (2006.01) |
| C04B 103/40 | (2006.01) |

(52) U.S. Cl.
CPC ............ *C04B 22/148* (2013.01); *C04B 22/16* (2013.01); *C04B 24/04* (2013.01); *C04B 24/122* (2013.01); *C04B 24/123* (2013.01); *C04B 24/2611* (2013.01); *C04B 24/2641* (2013.01); *C04B 24/383* (2013.01); *C04B 38/02* (2013.01); *C04B 40/0039* (2013.01); *C04B 2103/10* (2013.01); *C04B 2103/408* (2013.01); *C04B 2103/44* (2013.01); *C04B 2111/00698* (2013.01); *C04B 2111/40* (2013.01)

(56) References Cited

U.S. PATENT DOCUMENTS

| | | | |
|---|---|---|---|
| 1,970,663 | A | 8/1934 | Lefebure |
| 2,078,199 | A | 4/1937 | King |
| 2,451,446 | A | 10/1948 | Parsons |
| 3,199,997 | A | 8/1965 | Johnson |
| 3,359,146 | A | 12/1967 | Lane et al. |
| 3,573,947 | A | 4/1971 | Kinkade et al. |
| 3,878,278 | A | 4/1975 | Miller et al. |
| 4,040,850 | A * | 8/1977 | Kyri ............ C04B 28/14 106/680 |
| 4,127,628 | A * | 11/1978 | Uchida ............ C04B 28/14 264/122 |
| 4,514,471 | A * | 4/1985 | Sugimoto ............ C04B 41/63 156/39 |
| 4,661,161 | A | 4/1987 | Jakacki et al. |
| 4,724,242 | A | 2/1988 | Vassileff |
| 4,804,688 | A | 2/1989 | Vassileff |
| 4,804,698 | A * | 2/1989 | Schleifstein ......... C08K 5/3417 524/412 |
| 4,820,754 | A | 4/1989 | Negri et al. |
| 5,653,797 | A | 8/1997 | Patel |
| 5,683,635 | A | 11/1997 | Sucech et al. |
| 5,746,822 | A | 5/1998 | Espinoza et al. |
| 5,779,786 | A | 7/1998 | Patel |
| 6,162,839 | A | 12/2000 | Klauck et al. |
| 6,238,476 | B1 | 5/2001 | Sprinkle |
| 6,342,284 | B1 * | 1/2002 | Yu ............ E04C 2/04 106/785 |
| 6,406,537 | B1 | 6/2002 | Immordino |
| 6,409,825 | B1 | 6/2002 | Yu et al. |
| 6,632,550 | B1 * | 10/2003 | Yu ............ C04B 41/52 156/39 |
| 6,673,144 | B2 | 1/2004 | Immordino, Jr. et al. |
| 6,740,395 | B2 | 5/2004 | Halm et al. |
| 6,805,741 | B1 | 10/2004 | Liu et al. |
| 6,884,830 | B1 | 4/2005 | Hornaman |
| 7,759,416 | B2 | 7/2010 | Liling |
| 7,767,019 | B2 | 8/2010 | Liu et al. |
| 7,819,993 | B2 | 10/2010 | Seki et al. |
| 7,842,218 | B2 | 11/2010 | Bonetto et al. |
| 8,088,218 | B2 | 1/2012 | Blackburn et al. |
| 8,142,915 | B2 | 3/2012 | Blackburn et al. |
| 8,616,153 | B2 | 12/2013 | Abbott et al. |
| 8,642,346 | B2 | 2/2014 | Immordino, Jr. et al. |
| 8,673,071 | B2 | 3/2014 | Immordino, Jr. et al. |
| 8,975,321 | B2 | 3/2015 | Cimaglio et al. |
| 9,174,881 | B2 | 11/2015 | Cimaglio et al. |
| 9,279,054 | B2 | 3/2016 | Schoenfeld et al. |
| 2003/0084980 | A1 | 5/2003 | Seufert et al. |
| 2004/0168801 | A1 | 9/2004 | Reddy et al. |
| 2005/0161853 | A1 | 7/2005 | Miller et al. |
| 2005/0241541 | A1 | 11/2005 | Hohn et al. |
| 2006/0162839 | A1 | 7/2006 | Seki et al. |
| 2006/0280898 | A1 | 12/2006 | Lettkeman et al. |
| 2008/0303191 | A1 * | 12/2008 | Miller ............ C04B 28/14 264/333 |
| 2010/0175590 | A1 | 7/2010 | Stevens et al. |
| 2011/0024028 | A1 | 2/2011 | Immordino et al. |
| 2011/0136945 | A1 | 6/2011 | Martin et al. |
| 2014/0315008 | A1 * | 10/2014 | Francis ............ B32B 37/15 156/45 |
| 2016/0102018 | A1 * | 4/2016 | Dorris ............ B32B 13/04 428/116 |
| 2017/0362124 | A1 * | 12/2017 | Sang ............ B32B 37/12 |
| 2018/0099908 | A1 * | 4/2018 | Emami ............ C04B 38/02 |
| 2019/0315659 | A1 * | 10/2019 | Pelot ............ C04B 22/16 |

FOREIGN PATENT DOCUMENTS

| | | | |
|---|---|---|---|
| CA | 2016321 | A1 | 11/1991 |
| CA | 2241261 | A1 | 6/1997 |
| CH | 383247 | A | 10/1964 |
| CN | 1751003 | A | 3/2006 |
| CN | 1914032 | A | 2/2007 |
| CN | 1946649 | A | 4/2007 |
| CN | 101033127 | A | 9/2007 |
| CN | 102712536 | A | 10/2012 |
| DE | 824105 | C | 12/1951 |
| DE | 1250327 | B | 9/1967 |
| DE | 1300459 | B | 7/1969 |
| DE | 102014103252 | A1 | 9/2015 |
| EP | 0562651 | A1 | 9/1993 |
| EP | 2045227 | A1 | 4/2009 |
| EP | 2135933 | A1 | 12/2009 |
| FR | 738997 | A | 1/1933 |
| GB | 1 590 419 | A | 6/1981 |
| OA | 5831 | A | 5/1981 |
| WO | 8603505 | A1 | 6/1986 |
| WO | 2011096925 | A1 | 8/2011 |
| WO | 2017214336 | A1 | 12/2017 |

OTHER PUBLICATIONS

Chinese Office Action dated Mar. 1, 2022 to United States Gypsum Company for Chinese Patent Application No. 201980019469.0.
Zhang Jin Feng, et al., "China Concrete and Cement Products", 1000-4637, Dec. 2005, Issue 6, pp. 47-50, China Academic Journal Electronic Publishing House, with Machine Translation of Abstract.
Adnan Colak, "Density and Strength Characteristics of Foamed Gypsum", Cement & Concrete Composites 22 (2000) pp. 193-200, Elsevier Science Ltd.

* cited by examiner

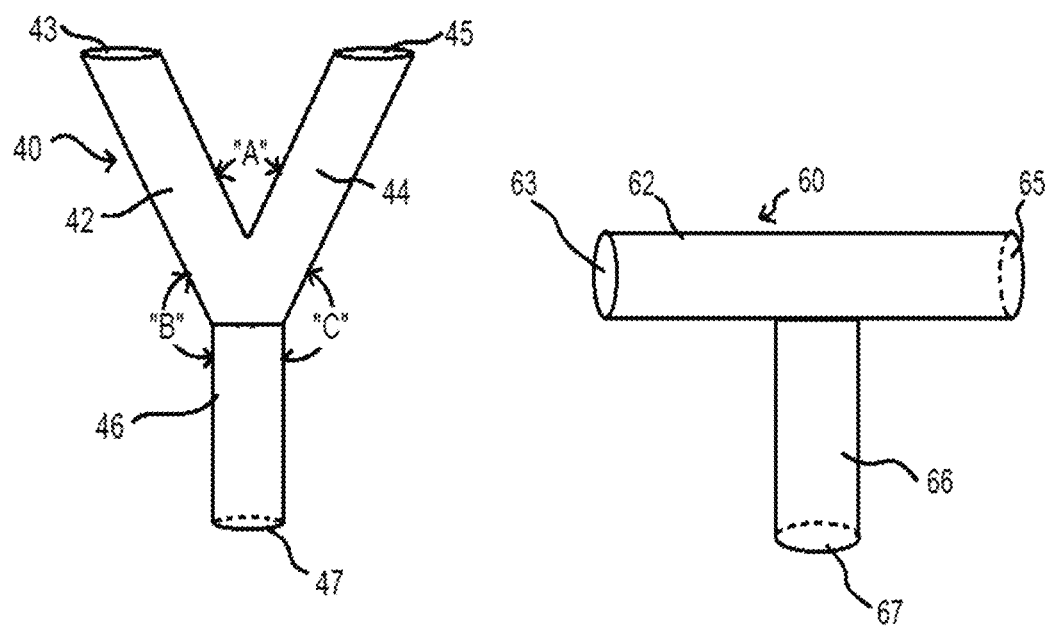
FIG. 1
FIG. 2
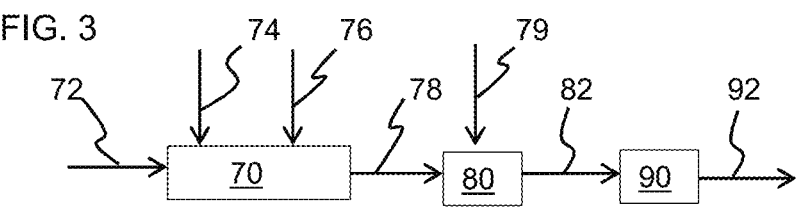
FIG. 3

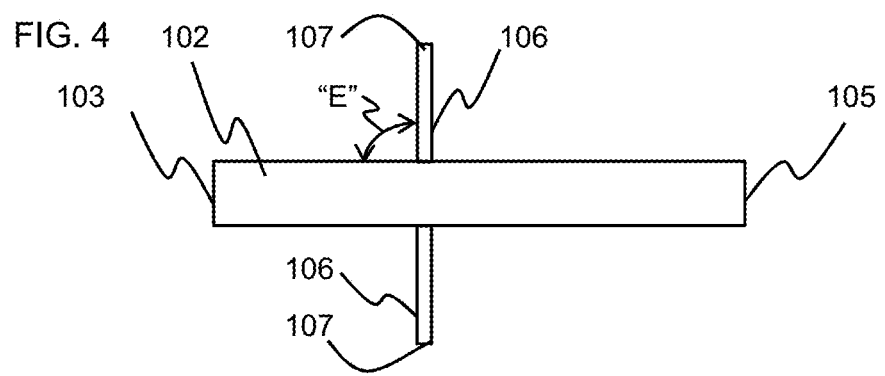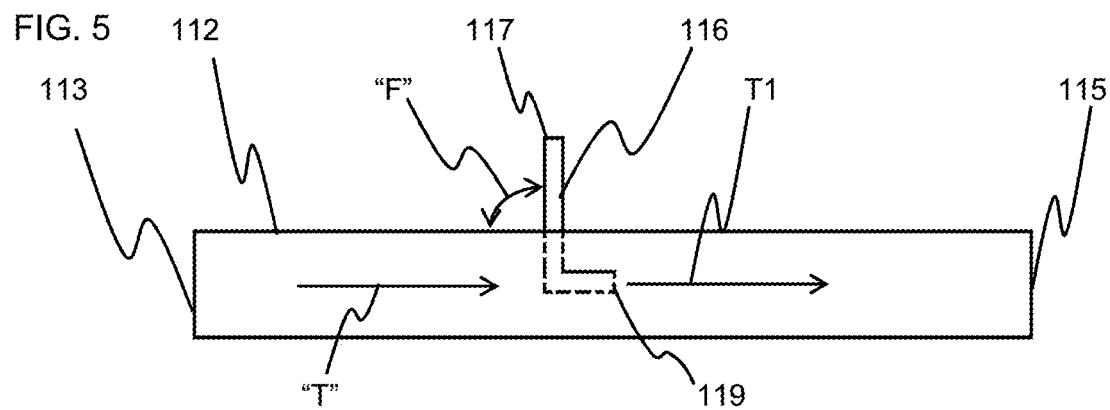

METHOD FOR MAKING A LIGHTWEIGHT GYPSUM COMPOSITION WITH INTERNALLY GENERATED FOAM AND PRODUCTS MADE FROM SAME

CROSS-REFERENCE TO RELATED APPLICATIONS

This claims the benefit of U.S. provisional patent application No. 62/663,649, filed Apr. 27, 2018, incorporated herein by reference.

FIELD OF THE INVENTION

This invention relates to a method and composition for preparing foamed gypsum slurry and gypsum product from the slurry with voids embedded in structure of the product. Uses for this product include application of this controllable rapid setting gypsum based foam material as cavity (large or small) or crack filler.

BACKGROUND

Typically, gypsum-containing cementitious products are made by preparing a mixture of calcined gypsum (calcium sulfate alpha or beta hemihydrate and/or calcium sulfate anhydrite), water, and other components, as appropriate to form cementitious slurry. In the manufacture of cementitious articles, the cementitious slurry and desired additives are often blended in a continuous mixer, as for example described in U.S. Pat. No. 3,359,146. For example, in a typical gypsum panel manufacturing process, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit to make a foamed slurry.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein. Thus, there is a continuing need for new and improved set gypsum-containing products, and compositions and methods for producing them, that solve, avoid, or minimize a problem noted above.

SUMMARY OF THE INVENTION

Rapid foaming of gypsum based materials is achieved through the chemical reaction between a carbonate source (such as calcium carbonate) and an acidic activator (such as aluminum sulfate). This chemical reaction produces carbon dioxide gas as a byproduct which is used as the foaming agent resulting in a final material with a controlled or tuned bubble structure. This invention/concept demonstrates the application of a controllable rapid setting gypsum based foam material as cavity (large or small) or crack filler.

A filler material with a low density and improved insulation properties (such as thermal, sound) can be achieved by using a foam structured material. The specific physical properties can be tuned for specific applications. These materials can be applied by spraying or filling, or other means in cracks/cavities/indentations. Once applied, chemical reactions cause internal generation of gas (carbon dioxide) causing expansion of the material which fills the gaps or voids. Or when poured as a foam, partial of mostly expanded, final stages of expansion will fill gaps or voids.

The amount and rate of foaming and expansion of the material is determined by the concentration of the raw materials and rate of the reaction before the slurry sets. The properties such as density, acoustic and thermal insulation, and mechanical properties in the wet or dry or cured state are also determined by the concentration of the raw materials and the rate of the reaction.

The gas generated foaming characteristics of this invention could be used in a variety of products including cavity infill, crack filler, insulation, gypsum panels, gypsum plasters, fireproofing sealants, lightweight ceiling tiles, joint compounds, coatings and texture products. A chemical reaction is not initiated until the powder is mixed with water, causing an evolution of gas within the cellular matrix. The initial reaction is delayed slightly, permitting manipulation of the wet mixture before the foaming process intensifies.

Thus, a filler material with a low density and improved insulation properties (such as thermal, sound, etc.) can be achieved by using a foam structured material. These materials can be applied by spraying or pouring or other means in any form such as cracks/cavities/indentations. Once applied or before in the mechanical device which applies the material, chemical reactions cause internal generation of gas (carbon dioxide) causing expansion of the material which fills the gaps or voids.

The invention provides for a method of making a foamed gypsum slurry having 15 to 90 volume percent gas bubbles, and wherein the method comprises:

passing a first slurry comprising water, 50 to 98 wt. % calcium sulfate hemihydrate on a dry basis, 1 to 50 wt. % calcium carbonate on a dry basis, and 0.1 to 10 wt. % cellulose thickener on a dry basis via a first hose to a Wye connector conduit at Rate C, wherein the first slurry has a residence time in the first hose of Time 2;

passing an alum solution comprising an aluminum compound via a second hose to the Wye connector conduit at Rate D;

passing the first slurry and the alum solution through respective inlet openings of the Wye connector conduit to combine in the Wye connector conduit to create a combined mixed stream that discharges from the Wye connector conduit through a discharge opening;

mixing the combined mixed stream in a static mixer for Time 3 to activate at least a portion of the calcium carbonate by reacting the portion of the calcium carbonate with the aluminum compound to create a foamed gypsum slurry;

transferring the foamed gypsum slurry from the static mixer to a cavity between two wall boards via a third hose, wherein the residence time in the third hose is Time 4; and allowing the foamed gypsum slurry in the cavity to expand, harden and dry.

Optionally, said method can also include:

adding a mixture comprising the calcium sulfate hemihydrate, the calcium carbonate, and the cellulose thickener to a mixing chamber at Rate A;

adding water to the mixing chamber at Rate B; and
mixing the mixture with water in the mixing chamber for Time 1 to form the first slurry.

Preferably the mixture comprising calcium sulfate hemihydrate, the calcium carbonate, and the cellulose thickener further comprises, based on 100 parts by weight (on a dry, water free basis) of said ingredients of said mixture, at least one of:

0.1 to 1 wt. % chelating agent, preferably selected from
Diethylenetriaminepentaacetic acid (DTPA, also known as pentetic acid)
Ethylenediaminetetraacetic acid (EDTA)
Sodium polyacrylate
Polyphosphate, preferably Tetrasodium pyrophosphate (TSPP) and/or sodium tripolyphosphate (STMP), if the polyphosphate is present as a dispersant and a chelating agent the amount added as a chelating agent is in addition to the amount added as a dispersant, more preferably the chelating agent is selected from sodium polyacrylate or Tetrasodium pyrophosphate, and most preferably the chelating agent is sodium polyacrylate;
0.05 to 1 wt. % biocide.

If desired the mixture ingredients may also include one or more of the following additives, based on 100 parts by weight of said ingredients of said mixture on a dry (water not included) basis:

0.1 to 10 wt. % acrylate thickener selected from at least one member of the group consisting of sodium polyacrylates and water-soluble copolymers based on acrylic and (meth) acrylic acid, preferably selected from at least one member of the group consisting of sodium polyacrylate, acrylic acid/acrylamide and (meth)acrylic acid/acrylic ester copolymers, most preferably sodium polyacrylate;

0.1 to 10 wt. % casein, gum arabic, guar gum, tragacanth gum, starch (from any base source), sodium alginate;

0.02 to 1 wt. % citric acid, tartaric acid, malic acid, acetic acid, boric acid, preferably citric acid;

0.02 to 2 wt. % a pH increasing salt, for example alkali metal salt of citric acid, sodium bicarbonate, and/or magnesium hydroxide, preferably at least one of sodium citrate, potassium citrate, sodium bicarbonate, or magnesium hydroxide, most preferably sodium citrate or magnesium hydroxide;

0.02 to 2 wt. % accelerator, the accelerator selected from the group consisting of potassium sulfate, an organic phosphonic compound, a phosphate-containing compound, and accelerator comprising calcium sulfate dihydrate and sugar, preferably the accelerator comprises calcium sulfate dihydrate and sugar;

0.1 to 5 wt. % preferably 0.5-3 wt. % foaming agent,
preferably the foaming agent is selected from the group consisting of alkyl benzene sulfonate, fatty acid salts, sodium lauryl sulfate, alkyl sulfate salts, sodium lauryl ether sulfate, sodium alkyl ether sulfate, (sodium C14-16 olefin sulfonate, alpha-olefin sulfonates, phosphate esters, sulphosuccinates, alkyl phenol ether sulfates, and isethionates,
more preferably alpha-olefin sulfonate, alkyl sulfonates, alkylbenzolfulfonates and alkyl ether sulfate oligomers,
furthermore preferably at least one member of the group consisting of sodium lauryl ether sulfate, ammonium C10-C12 alcohol ether sulfate, sodium C14-16 olefin sulfonate, and sodium polypropoxy-polyethoxy-decyl sulfate (molecular formula $C_{10}H_{22}$—$O(C_3H_6$—$OC_2H_4$—$O)_x$—$H_2SO_4$—$Na$),
most preferably a mixture comprising 20 to 25% butyl diglycol, 7 to 15% sodium lauryl ether sulfate, and 3 to 5% alcohols C10-C16;

1 to 20 wt. %, preferably 5 to 10 wt. %, latex polymer, preferably the latex polymer is selected from at least one member of the group consisting of polyvinyl acetate latex, polyvinyl acrylate and polyvinyl chloride latex, acrylics, styrene acrylics, acrylic esters, vinyl acrylics, vinyl chloride, vinyl chloride acrylic, styrene acetate acrylics, ethylene polyvinyl acetate, styrene butadiene, and combinations thereof, more preferably the latex polymer is selected from at least one member of the group consisting of acrylic polymer and styrene butadiene polymer, 0.01 to 1 wt. % 2-amino-2-methyl-1-propanol;

0.05 to 2 wt. %, typically 0.1 to 2 wt. %, polycarboxylate dispersant, preferably the polycarboxylate dispersant comprises a polycarboxylic ether dispersant;

0.05 to 2 wt. %, typically 0.1 to 2 wt. %, polyphosphate dispersant, preferably the polyphosphate dispersant is selected from at least one member of the group consisting of sodium trimetaphosphate (STMP), sodium tripolyphosphate (STPP), potassium tripolyphosphate (KTPP), tetrasodium pyrophosphate (TSPP), and tetrapotassium pyrophosphate (TKPP), more preferably the polyphosphate dispersant is sodium trimetaphosphate (STMP) or tetrasodium pyrophosphate (TSPP), most preferably the polyphosphate dispersant comprises sodium trimetaphosphate (STMP), wherein if the polyphosphate is present as a dispersant and a chelating agent (as discussed elsewhere in the specification) the amount added as a chelating agent is in addition to the amount added as a dispersant, for example, when 0.05 to 2 wt. %, typically 0.1 to 2 wt. %, polyphosphate, is present as a dispersant and 0.1 to 1 wt. % polyphosphate is added as a chelating agent then the composition has 0.15 to 3 wt. %, typically 0.2 to 3 wt. %, total polyphosphate;

0.01 to 2 wt. %, typically 0.1 to 2 wt. %, naphthalene dispersant or lignosulfonate dispersant, preferably the naphthalene dispersant is selected from at least one of beta-naphthalene sulfonate, naphthalene sulfonate formaldehyde condensate and sodium naphthalene sulfate formaldehyde condensate, preferably the lignosulfonate;

0.01 to 0.5 wt. % silicon based defoamer, 1 to 5 wt. % inorganic particles selected from clay, pigment particles, and combinations thereof, preferably the pigment particles comprises titanium dioxide;

0.05 to 1% Polyethylene Oxide (PEO).

For example, the mixture may comprise 0.05 to 1% Polyethylene Oxide (PEO) but not the other additives. Or, for example the mixture may comprise 0.05 to 1% Polyethylene Oxide (PEO) and one or more of the other additives.

The latex polymer may be added as a dry redispersible powder or as part of a latex comprising surfactant and the latex polymer dispersed as solids in aqueous medium. Typical latex is 40 to 60 wt. % latex polymer.

Preferably the gypsum-based composition comprises the ingredients comprising, based on 100 parts by weight of said ingredients:

50 to 98 wt. % calcium sulfate hemihydrate;

1.5 to 50 wt. %, more preferably 3 to 40 wt. % calcium carbonate;

0.5 to 30 wt. %, more preferably 1.5 to 30 wt. %, most preferably 3 to 20 wt. %, aluminum sulfate;

0 to 1 wt. % citric acid;

0 to 2 wt. % sodium citrate;

0 to 2 wt. % the accelerator comprising calcium sulfate dihydrate and sugar;

0.2 to 3 wt. %, cellulose thickener comprising hydroxy methyl propyl cellulose or hydroxy methyl ethyl cellulose;

0-3 wt. % said foaming agent, wherein said foaming agent is selected from the group consisting of alkyl benzene sulfonate, fatty acid salts, sodium lauryl sulfate, alkyl sulfate salts, sodium lauryl ether sulfate, sodium alkyl ether sulfate, sodium C14-16 olefin sulfonate, alpha-olefin sulfonates, phosphate esters, sulphosuccinates, alkyl phenol ether sulfates, and isethionates;

0 to 20 wt. %, latex comprising surfactant and latex polymer dispersed as solids in aqueous medium, the latex polymer is selected from at least one member of the group consisting of acrylic polymer and styrene butadiene polymer;

0 to 1 wt. % 2-amino-2-methyl-1-propanol;

0 to 1 wt. % modifier comprising calcium hydroxide;

0.1 to 2 wt. % dispersant selected from at least one member of the group consisting of polycarboxylate dispersant, polyphosphate dispersant, and naphthalene dispersant;
  wherein the polycarboxylate dispersant comprises a polycarboxylic ether dispersant,
  wherein the naphthalene dispersant is selected from at least one of beta-naphthalene sulfonate, naphthalene sulfonate formaldehyde condensate and sodium naphthalene sulfate formaldehyde condensate,
  wherein the polyphosphate dispersant is selected from at least one member of the group consisting of sodium trimetaphosphate (STMP), sodium tripolyphosphate (STPP), potassium tripolyphosphate (KTPP), tetrasodium pyrophosphate, and tetrapotassium pyrophosphate (TKPP), more preferably the polyphosphate dispersant is sodium trimetaphosphate (STMP) or tetrasodium pyrophosphate (TSPP), most preferably the polyphosphate dispersant comprises sodium trimetaphosphate (STMP);

0 to 2 wt. % acrylate thickener selected from at least one member of the group consisting of sodium polyacrylate, acrylic acid/acrylamide and (meth)acrylic acid/acrylic ester copolymers, most preferably sodium polyacrylate;

0 to 1 wt. % chelating agent comprising one or more of:

Diethylene triamine pentaacetic acid (DTPA, also known as pentetic acid)

Ethylene diamine tetraacetic acid (EDTA)

Sodium polyacrylate

Polyphosphate, preferably tetrasodium pyrophosphate (TSPP), wherein if the polyphosphate is present as a dispersant and a chelating agent the amount of polyphosphate added as a chelating agent is in addition to the amount of polyphosphate added as a dispersant, thus, when 0.1 to 2 wt. % polyphosphate is present as a dispersant and 0 to 1 wt. % polyphosphate is present as a chelating agent then the composition has 0.1 to 3 wt. % total polyphosphate, more preferably the chelating agent is selected from sodium polyacrylate or tetrasodium pyrophosphate, and most preferably sodium polyacrylate;

0 to 1 wt. % biocide, typically 0.05 to 1 wt. % biocide;

0 to 0.5 wt. % silicon based defoamer, 0 to 5 wt. % inorganic particles selected from clay, pigment particles, and combinations thereof, preferably the pigment particles comprise titanium dioxide, 0-10% wt. % lightweight aggregate, such as perlite (coated and uncoated) or polystyrene).

The invention also provides a method of making a foamed gypsum product, comprising mixing:
  water; and
  the above-listed gypsum-based composition ingredients of the invention to form the above-listed foamed gypsum slurry,
  wherein the water to calcium sulfate hemihydrates weight ratio to 0.2-2:1;
  wherein calcium sulfate hemihydrate in the foamed gypsum slurry converts to calcium sulfate dihydrate and sets and dries to form the foamed gypsum product,
  wherein the foamed gypsum product resulting from the set and dried foamed gypsum slurry has a density of 10 to 55 pounds/cubic foot (pcf),
  wherein the foamed gypsum product has a total void volume of 30 to 90 volume percent.

For instance for the foamed gypsum slurry and the foamed product the gypsum-based composition ingredients of the invention comprise a mixture of ingredients, based on 100 parts by weight of said ingredients on a water free basis, comprising:
  50 to 98 wt. % calcium sulfate hemihydrate;
  a combination of compounds for generating a gas comprising:
    1.5 to 50 wt. % calcium carbonate and 1.5 to 30 wt. % at least one aluminum compound selected from aluminum sulfate and potassium aluminum sulfate for generating $CO_2$ gas; and/or
    0.1 to 10 wt. % cellulose thickener.

Typical cavities are considered as open space between studs and drywall.

However, special case cavities have located therein piping, support studs, conduits, electrical boxes, HVAC, etc. Special case cavities cannot have lightweight foam pumped in from above since the material does not flow enough to flow around the obstructions.

If the material is to be pumped into such special cavities then a less foamed slurry may be desirable to allow for flow to maneuver around the obstructions. In such instances for the foamed gypsum slurry and the foamed product the gypsum-based composition ingredients of the invention comprise a mixture of ingredients, based on 100 parts by weight of the ingredients on a water free basis, comprising:
  50 to 98 wt. % calcium sulfate hemihydrate;
  a combination of compounds for generating a gas comprising:
    1.5 to 50 wt. % calcium carbonate and 0.5 to 30 wt. %, typically 1.0 to 30 wt. %, at least one aluminum compound selected from aluminum sulfate and potassium aluminum sulfate for generating $CO_2$ gas; and/or
    0.1 to 10 wt. % cellulose thickener.

The invention also comprises a cavity wall system comprising:
  opposed board panels, preferably wall board panels, such as gypsum board panels or cement board panels, most preferably gypsum board panels, attached to a frame comprising studs to define a cavity between the opposed panels, typically the panels are vertical board panels;
  the foamed gypsum product resulting from the set and dried foamed gypsum slurry located within the cavity, the foamed gypsum product having the density of 10 to 55 pounds/cubic foot, wherein the foamed gypsum product has a total void volume of 30 to 90 volume percent.

The invention also provides a method of filling a cavity wall system with the foamed gypsum slurry of the invention comprising:
  filling a cavity with a first foamed gypsum slurry to a first fill vertical distance within the cavity of about 6 inches to about 10 feet, typically about 6 inches to about 6 feet;

allowing the first foamed gypsum slurry in the cavity to expand and gain significant green strength harden to create a green foamed gypsum product;

making a second foamed gypsum slurry;

filling the cavity with the second foamed gypsum slurry on top of the green foamed gypsum product to a second fill vertical distance within the cavity of about 6 inches to about 10 feet, typically about 6 inches to about 6 feet; and allowing the second foamed gypsum slurry in the cavity to expand, harden and dry.

As used herein, the term, "calcined gypsum", is intended to mean alpha calcium sulfate hemihydrate, beta calcium sulfate hemihydrate, water-soluble calcium sulfate anhydrite, or mixtures of any or all thereof, and the terms, "set gypsum" and "hydrated gypsum", are intended to mean calcium sulfate dihydrate.

The water in the mixture reacts spontaneously with the calcined gypsum to form set gypsum.

In the present specification, all percentages and ratios are by weight unless otherwise indicated; and all molecular weights are weight average molecular weights unless otherwise indicated.

In the present specification, any mention of cavity, infill, filler, or any similar wording is purposely open ended and can mean any cavity made from any material in any shape and the final result can be a composite (of any number of materials) or single material.

DESCRIPTION OF THE DRAWINGS

FIG. 1 shows a Wye connector.
FIG. 2 shows a T-connector.
FIG. 3 shows a process flow diagram.
FIG. 4 shows a connector conduit with multiple inlets.
FIG. 5 shows a connector conduit with a coaxial feed.

DESCRIPTION OF PREFERRED EMBODIMENTS

Figure 6:
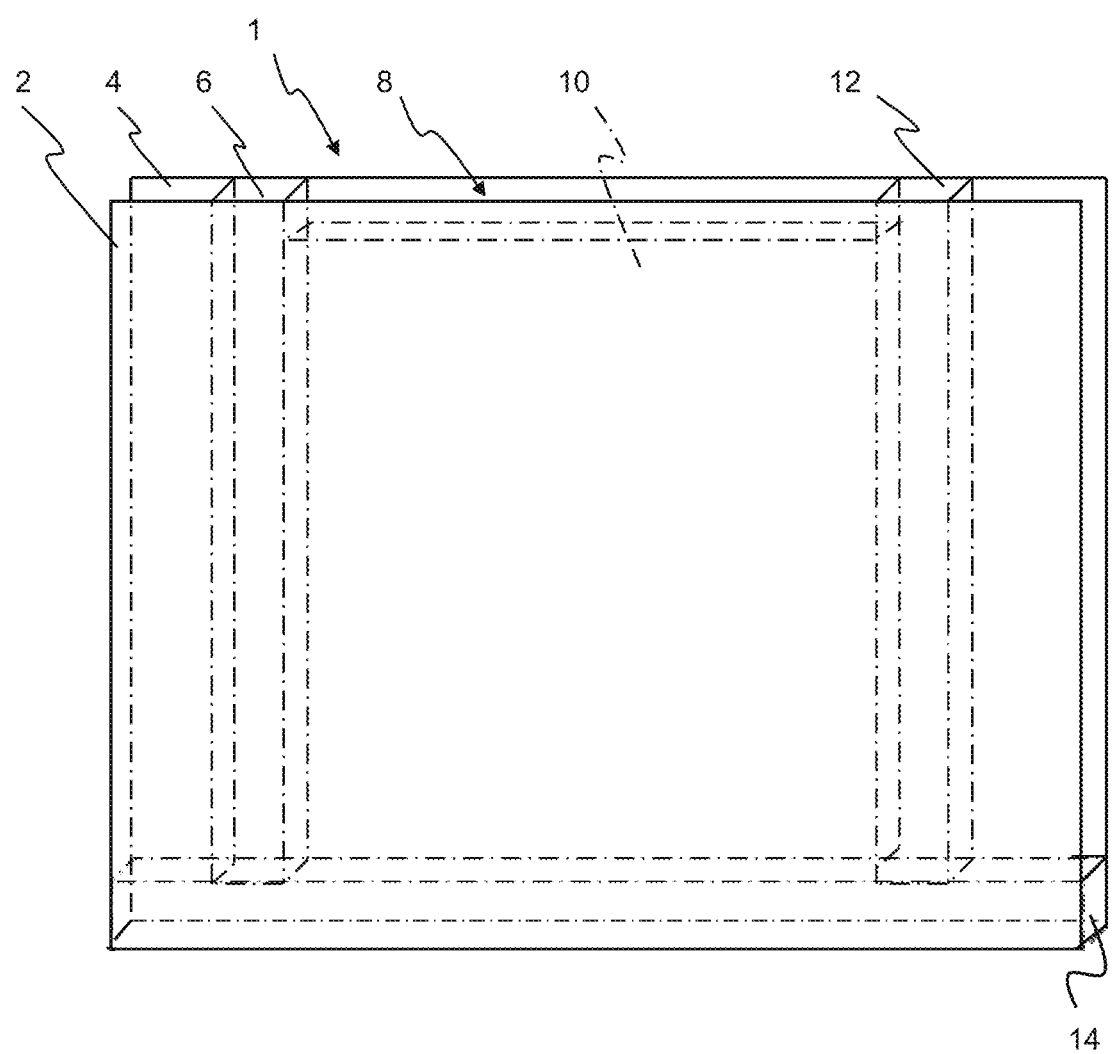
FIG. 6 shows a cavity wall system of the present invention.

This invention demonstrates a controllable rapid foaming/rapid setting gypsum based material. Rapid expanding foamed gypsum material can be spray applied or pumped.

Applications for this technology include, in part or collectively, the concepts and/or product applications below:

1) In-fill material for framed construction, metal door frame/commercial construction wall assembly applications, shaft wall assemblies.
2) On site cast in place construction blocks and/or extruded block, partial wall, full wall assemblies.
3) Improved Fire-Stop applications.
4) Replacement as a 0-VOC material for higher VOC caulks, sealants, compounds, expanding urethane foam.
5) Thermal insulating material applications.

The present invention provides a new method for creating gypsum slurry and set gypsum product with air voids embedded in the structure. This is able to trap and contain internally generated gas causing the bulk material to expand. In versions of the invention employing aluminum sulfate (acid) and calcium carbonate (base), the internally generated gas used for expansion results from an acid-base chemical reaction between aluminum sulfate (acid) and calcium carbonate (base), which generates carbon dioxide ($CO_2$) gas. The typical chemical reaction that describes how aluminum sulfate and calcium carbonate react to create carbon dioxide gas is shown as formula (I):

$$Al_2(SO_4)_3 + 3CaCO_3 + 3H_2O \gg 2Al(OH)_3 + 3CO_2 + 3CaSO_4 \quad (I)$$

The $CO_2$ is generated due to formation of an unstable compound, aluminum carbonate, and decomposition of aluminum carbonate to generate $CO_2$ as a byproduct in the system. Incorporating voids into a medium has been known for many years to enhance certain properties within the material (thermal resistance, acoustics, etc.). Incorporating voids into a medium can be done using various methods:

1. Compressing the gas under pressure (such as carbonated water)
2. Injecting the gas in the medium (such as conventional gypsum panel creation)
3. Internally generating the gas in the medium (the present invention)

The present invention internally generates the gas within the medium through the chemical reaction discussed above. This invention can be exploited in various applications. The resulting foamed gypsum slurry can be employed to fill the cavity in cavity wall construction. For example, the cavity wall construction system comprises two gypsum panels, studs and fiberglass insulation (in some cases insulation is not used). However, the present invention provides wall systems utilizing novel self-foaming gypsum based slurry as cavity infill material for cavity wall construction.

Thus, the present invention provides a low-density cavity wall system with enhanced mechanical and insulating properties including acoustics and heat transfer (R-value). For example, the final lightweight gypsum composition can have a density of about 10 pcf (pounds per cubic foot) to about 80 pcf. The desired density can be achieved by (I) increasing or decreasing the amount of foaming, (II) increasing or decreasing the amount of water in the slurry, and a combination thereof.

Discussion of Gas Generation

Normally when a gas is generated internally in a fluid, a part of it will be dissolved in the liquid surrounding it, a part of it diffuses in the medium, and part will escape the medium. To make a low-density foam material with improved acoustical, fire resistance properties, and heat insulation, the gas must be trapped inside the fluid and prevent its diffusion, dissolution, and mobility in the slurry to retain the bubble structure. When the generated gas is trapped inside the slurry it results in the expansion of the material only when the slurry has the proper rheological properties. The rate of the expansion depends on the kinetics of the chemical reaction and the dynamics of the bubble growth. The potential level of expansion depends on the amount of the reactants calcium carbonate and aluminum sulfate and their stoichiometric ratios.

The ability of the fluid to expand to its maximum potential, based on the number of reactants, is governed by the rheological properties.

The key factor is modification of the rheological properties of the fluid. The present invention achieves this using various rheology modifiers:

Organics such as:
  Cellulosic Thickeners
  Dispersants
  Alcohols
Inorganics such as:
  Clays The cellulosic thickener provides viscosity and elasticity and has little to no impact on the hydration and strength of gypsum crystals. This is not the case with other bubble stabilizing materials such as surfactant, dispersants, and alcohols.

These are the main reasons why cellulosic thickeners are special in this foamed gypsum material but also make the formulation non-obvious and unique.

In the present invention, aluminum sulfate and calcium carbonate react when mixed in water to generate $CO_2$ internally and the plaster (stucco) slurry expands to a certain degree. However, without using rheology modifiers in the gypsum based slurry, the material will not be able to reach its maximum expansion potential or will collapse after reaching that potential.

One of the uses of the material produced by the present invention is to be used as insulation, which relevant properties include:
1. Mechanical: Adhesion, Impact, Compressive, Tensile
2. Thermal: R-Value, Fire resistance
3. Acoustical: STC
4. Density: Low, medium, high depending on the application Controlling the Reaction by Encapsulation The present invention is based on an acid-base reaction which takes place rapidly upon mixing of the reactants and generation of the gas starts immediately, generally within ten, preferably within five seconds, as the alum (also known as aluminum sulfate and/or potassium aluminum sulfate) encounters the calcium carbonate particles. However, rapid kinetics of the acid/base reaction make it difficult to entrap the gas in the slurry during the mechanical/manual mixing of the slurry and pouring it in the wall cavity. It is also challenging for the user to custom mix it on the job site, considering the time needed to fully disperse the alum in the slurry using a mechanical/manual mixer. Encapsulation of the alum powder particles in a shell results in a controlled release of the powder when adequate shear force is applied to the encapsulated particles in the slurry during the mixing process. Applying shear stress during mixing of the slurry will rupture the shell and expose the alum to the slurry. Chemical reaction will, then, begin once the alum particles are dispersed uniformly in the slurry which will results in the expansion of the gypsum-based material. The method of controlled release of the powder will ensure the gas will not escape the system during the mixing and pouring processes.

Encapsulated controlled release of an active ingredient, for example the aluminum compound (alum) is classified in two categories:
1) A first group in which the release is governed by the rate of water permeation through a polymeric or copolymeric membrane of the capsules, and by the rate of alum diffusion away from each coated particle into the surrounding slurry.
2) A second group with relatively thick encapsulating coats in which release of the active ingredient is governed mainly when the capsules are broken by pressure or shear force.

Any of the active ingredients, namely aluminum compound or calcium carbonate, which react to cause foaming can be encapsulated to control release.

Encapsulation (coating) can be achieved by different methods:
1) Alginate Encapsulation
2) Polyoxymethylene Urea Microencapsulation
3) Complex Coacervation (Gelatin) Microencapsulation
4) Gel Beads The coating materials generally used for coating are:
1) Ethyl cellulose
2) Polyvinyl alcohol
3) Gelatin
4) Sugar
5) Sodium alginate Thus, the aluminum compound may be fed to the mixture as alum powder particles encapsulated in a shell and there is a controlled release of the alum powder when sufficient shear force is applied to the encapsulated alum powder particles in the slurry during the mixing. Or, the calcium carbonate may be encapsulated with a coating comprising a member of the group consisting of ethyl cellulose, polyvinyl alcohol, gelatin, sugar, and sodium alginate. Or, the calcium carbonate may be encapsulated with a coating comprising a member of the group consisting of ethyl cellulose, polyvinyl alcohol, gelatin, sugar, and sodium alginate.

Ingredients of the system and their purpose:
The slurry of the present invention comprises
Water: used to provide a medium for powders to react, hydrate, dissolve, have mobility, etc.
Stucco (Calcium Sulfate hemihydrate), used for the following reasons:
  Setting properties, therefore, provides strength and dry density
  Ability to control/manipulate its setting properties (time and final microstructure), therefore, control desired crystal structure.
  Fire properties, therefore, provides safety
Aluminum Sulfate (Alum), used for the following reasons:
  Source of gas generation
Calcium Carbonate, used for the following reasons:
  Filler
  Source of gas generation Typically the slurry includes one or more of the following additives:
A retarder such as sodium citrate and an accelerator such as WGA, HRA or CSA to control the setting properties of gypsum.
Chelating agents: Used to suspend gypsum set in applications where longer working time (workability) is desired. Able to suspend the set indefinitely.
Antimicrobial: Ensures resistance to microbial growth which will have an impact on the product performance.
pH modifiers: Enables rapid hydration of the rheology modifiers and impact rheology. They target coated cellulosic thickeners.
Coating reactants such as PVOH and sugar
Rheology modifiers, used to:
  Help stabilize the bubble structure
  Contain the gas in the slurry causing expansion
  Control diffusion of the gas and gas escape
  Control bubble coalescence
  Control upward mobility of the bubbles
  Prevent water drainage from bubble walls
  Prevent from settling of solids (water/solid separation)
  Prevent phase separation Unique rheological properties can act very fluid during mixing enabling easy dispersion but act thick when at rest which retards bubble mobility Examples of Specific Formulation Components:

Below are listed examples of various required and optional ingredients for making the slurry.

Water
Stucco (calcium sulfate hemihydrate)
Calcium carbonate
Sodium citrate
Sodium trimetaphosphate
Rheology Modifiers
    PEO (polyethylene oxide)
    PVOH (polyvinyl alcohol)
    Latex
    Soap
    Dispersants
    Superplasticizers, for example polynaphthalene sulfonates, polyacrylates, polycarboxylate ether-based (PCE) superplasticizers, etc.).
    Starch
    PCM (Phase Change Materials) PCMs are materials with high latent heat. They are added for the collection of heat when temperatures are higher and release heat when temperatures are lower to maintain the temperature within a room.
    HPMC (hydroxy propyl methyl cellulose)
    HEMC (hydroxy ethyl methyl cellulose)
    HEC (hydroxy ethyl cellulose)
    MC (methyl cellulose)
    MEC (methyl ethyl cellulose)
    EC (ethyl cellulose)
    CMC (carboxy methyl cellulose)
    Clay
    Zeolite
    CSA (Climate stabilized accelerator)
    HRA (Heat resistant accelerator)
    WGA (Wet gypsum accelerator)
2-amino-2-methyl-1-propanol
Chelating agent
    Diethylenetriaminepentaacetic acid (DTPA)
    Ethylenediaminetetraacetic acid (EDTA)
    Sodium polyacrylate
    Polyphosphate, preferably tetrasodium pyrophosphate (TSPP)
Antimicrobial agent
Acrylate thickener or dry equivalent
Citric Acid retarder
Suma proteinaceous retarder
Glass Fiber
Mineral Wool
Wax
Polyethylene Glycol (PEG)

Preparation of Materials/Process of Materials to Fill Wall Cavity

Method 1: Batch or Semi Continuous Batch Mixing

Slurry Making

Typically the dry components are pre-mixed. For example when making foamed slurry for use as cavity wall filler the dry (water free) components are already mixed before arriving at the jobsite. The order of addition of the dry components is not important. Thus, prior to entry into a mixer, All dry additives are added to the powdered gypsum.

Then the dry components are mixed with water (Wet mixing) to create a chelated gypsum slurry. This can be done using a variety of batch mixing techniques which will depend of batch size, blade design and speed and orientation, water ratio, etc.

The gypsum slurry from which the foamed gypsum product was made has a water to calcium sulfate hemihydrates weight ratio to 0.2-2:1.

Also the material can be made into a slurry during the production phase and arrive at the jobsite as a ready to use state.

Wet mixing of the slurry formulation can be done in high and low shear mixers (for example, a mixer which can operate at >10,000 rpm, or a mixer which can operate at 30 rpm). A significant advantage of the slurry of the present invention is that it can be made lump free in any mixing environment. Water demand varies with the formulation to maintain specific rheological properties and rendering particular bubble structures. Pre-blending the powders followed by mixing with water, results in uniform and lump-free slurry that does not:

Set
Settle (phase separation of solid/liquid)
Spoil

The slurry is made from gypsum (calcium sulfate hemihydrate), water, aluminum sulfate and calcium carbonate, and typically dispersant. In operation, to make the slurry the gypsum is fed to a slurry mixer. Water is also added. Some additives are added directly to the mixer. Other additives may be added to the water.

The slurry hydraulic component comprises at least 70% calcium sulfate hemihydrate by weight, preferably at least 90% calcium sulfate hemihydrate by weight, more preferably at least 95% calcium sulfate hemihydrate by weight, based on the dry weight of the hydraulic component, typically it is 100% calcium sulfate hemihydrate.

All components, except water, are premixed in a dry state.

During normal batch process, then the slurry is pumped to a container/hopper/pail/drum using a pump. Then Alum (powder or solution) is added to wet gypsum based slurry. Alum Powder is advantageous for ease of handling, but requires specific introduction into slurry for desired dispersion. Alum solution is advantageous for having better dispersion into the slurry.

During a semi-continuous batch process the material is slurried and sent to a holding area in which it is then pumped to mix with the alum. While the slurry is in transit to the holding area or when all the mixed slurry is in the holding area, a new batch can be started, therefore it is semi continuous.

Method 2: Continuous Mixing

Premixed dry gypsum based material can be added to a feeder drive and fed into a continuous mixer. Continuous because the amount of water that is metered in is directly related to the amount of dry powder that is being fed into the mixer component and that the water, dry powder, and/or slurry is continuously passing through the system.

Method 3: Ready to Use Gypsum Slurry

Gypsum slurry can also be prepared through the manufacturing process, which includes but is not limited to the previous two methods, and then delivered to the jobsite in a ready to use state.

When the gypsum slurry and the alum are combined, if the alum is a powder then the gypsum slurry is pumped from the container while the alum will be introduced into the hose of the slurry, such as using a screw drive. If the alum is a solution, then the gypsum slurry is pumped from the container while the alum is pumped from the alum solution container. Mixing of the two could include a Y ("Wye")

channel or T channel connection and/or a mixing device, such as a static mixer or dynamic mixer to provide a continuous mixing. Then the combined aluminum sulfate and calcium carbonate internally generate carbon dioxide gas within the slurry. A dynamic mixer is one that has moving parts, whereas a static mixer relies on the fluid moving past it for mixing to occur. The dynamic mixer is positioned in line. Thus, the invention contemplates adding the alum solution to a continuous mixer, more specifically the dynamic mixer, where it is mixed with the slurry.

In particular this provides a method of making foamed gypsum product, wherein the method is performed via batch, semi continuous batch, or continuous processing at a jobsite or as part of a manufacturing process, comprising:

mixing the calcium sulfate hemihydrate and the calcium carbonate with water to form a first slurry;

providing an Alum solution of the aluminum compound mixed with water;

passing the first slurry and the Alum solution through respective inlet openings of a connector conduit to combine in the connector conduit to create a combined mixed foaming stream which discharges from the connector conduit through a discharge opening of the connector conduit; mixing the combined mixed foaming stream in a combined stream mixer selected from a static mixer or a dynamic mixer to activate at least a portion of the calcium carbonate by reacting the portion of the calcium carbonate with the aluminum compound to generate $CO_2$ and create the foamed gypsum slurry;

transferring the combined mixed foaming stream from the combined stream mixer to a cavity between two wall boards; and allowing the foamed gypsum slurry in the cavity to expand, harden and dry to foamed gypsum product.

Preferably the connector conduit is a Wye connector or a T-connector.

FIG. 1 shows a Wye connector conduit 40. The Wye connector conduit 40 has a first side inlet pipe 42 defining a first said inlet opening 43 and a second side inlet pipe 44 defining a second said inlet opening 45 and a discharge pipe 46 defining a discharge opening 47. The Wye connector conduit first side inlet pipe 42 and the second side inlet pipe define 44 an acute angle "A". The Wye connector conduit 40 first side inlet pipe 42 and the discharge pipe 46 define a first obtuse angle "B". The Wye connector conduit second side inlet pipe 44 and the discharge pipe 46 define a second obtuse angle "C".

FIG. 2 shows a T-connector conduit 60. wherein the T-connector conduit 60 has a first pipe 62 having a first open end 63 opposed to a second open end 65 and a second pipe 66 in communication with the first pipe 62 and defining a third open end 67. The first pipe perpendicular 62 to the second pipe 66. One of the first open end 63, second open end 65 and third open end 67 is the first inlet opening. One of the first open end 63, second open end 65 and third open end 67 which is not the first inlet opening is the second inlet opening. The first open end 63, second open end 65 and third open end 67 which is not the first inlet opening or the second inlet opening is the discharge opening. For example, first open end 63 is the first inlet opening, second open end 65 is the second inlet opening and third open end 67 is the discharge opening.

FIG. 3 shows a flow chart of the method using the connector conduit. The calcium sulfate hemihydrate 72 and the calcium carbonate 74 and water 76 are mixed in a mixer 70 to form a first slurry 78. First slurry 78 and alum solution 79 feed a connector conduit 80, preferably selected from a Wye connector conduit and a T-connector conduit, to combine in the connector conduit 80 to create a combined mixed foaming stream 82 which discharges from the connector conduit through a discharge opening. The combined mixed foaming stream 82 is mixed in a combined stream mixer 90 selected from a static mixer or a dynamic mixer to activate at least a portion of the calcium carbonate by reacting the portion of the calcium carbonate with the aluminum compound to generate $CO_2$ and create the foamed gypsum slurry. The combined mixed foaming stream discharges as stream 92 and is transferred from the combined stream mixer 90 to a cavity between two wall boards (such as the cavity 8 of FIG. 6). The foamed gypsum slurry in the cavity is allowed to expand, harden and dry.

FIG. 4 shows an alternative to a Wye connector or a T-connector is to feed the ingredients to the connector conduit through more than one inlet opening. For example, the first slurry may be fed through one inlet opening of a first conduit and the alum solution may be fed into multiple inlet openings of conduits spaced about the first conduit to feed the first conduit. This is shown in FIG. 4 presenting a connector conduit having a first pipe 102 having a first inlet open end 103 opposed to a second open discharge end 105 and second pipes 106 having inlet openings 107 and in communication with the first pipe 102. The second pipes 106 may intersect the first pipe 102 at an angle "E" which is perpendicular (as shown) or is less than 90 degrees. First open end 103 is the first inlet opening, second open end 107 is the second inlet opening and third open end 105 is the discharge opening.

FIG. 5 shows another alternative to a Wye connector or a T-connector is to feed the ingredients into a connector conduit with a coaxial discharge as for example shown by FIG. 5. FIG. 5 shows a connector conduit having a first pipe 112 having a first inlet open end 113 opposed to a second open discharge end 105 and a second pipe 116 having inlet opening 117 and a discharge opening 119 in communication with the first pipe 102. The first slurry feeds the first open end 113. The first slurry flow direction is shown as a direction "T". The connector conduit has a discharge opening 119 for discharging the alum solution in a direction "T1" coaxial with flow of the first slurry in the first pipe. The second pipe 116 may intersect the first pipe 112 at an angle "F" which is perpendicular (as shown) or is less than 90 degrees. First open end 113 is the first inlet opening, second open end 117 is the second inlet opening and third open end 115 is the discharge opening for the combined first slurry and alum solution.

After contact with water, and possibly an acidic activator substance (such as aluminum sulfate), the gypsum (calcium sulfate hemihydrate) sets to convert to calcium sulfate dihydrate during production of the foamed gypsum product. Thus, once the alum and gypsum slurry are mixed to generate carbon dioxide, dispensing of the foaming material into the wall cavity can occur as a fully activated foam or a partially activated liquid that is foaming or any state between. Different application methods will be used depending on job site conditions and available equipment. The wall system, for example comprising studs and wall panels, for example, drywall panels, with a cavity filler will have higher mechanical, acoustical, and thermal resistance properties than the wall system comprising studs and wall panels without a cavity filler. Wall cavity infill can be any wall that has a cavity, for example, a combination of wall panels (for example gypsum board or cement board) and steel studs. Thus, for example, either gypsum boards or cement boards may be employed with this invention. However, cavity infill is not limited to uses with wall panels. The invention also contemplates filling the hollow core of foamed cellular concrete blocks.

FIG. 6 shows a cavity wall system 1 comprising studs 6, 12, 14 and gypsum drywall panels 2, 4, with a cavity 8 between the gypsum drywall panels 2, 4, and cavity filler 10 of the foamed gypsum of the present invention within the cavity 8.

The slurry from the slurry mixer for the gypsum core slurry then passes from the slurry mixer to a slurry distributor which deposits the slurry as desired. For example, it may be deposited in a wall cavity. The cavity itself can be temporary or permanent, on the job or at the production site, a composite system or single material. Under this broad definition, any space could be filled with this material or the material could be freely poured then formed.

An improvement to the invention is filling a portion of the cavity and allowing the most recently added portion of foamed gypsum product sufficient time to expand before filling another portion of the cavity. Expansion of the foamed gypsum product within the cavity applies pressure to the cavity wall. There are two main parameters of the filling method that can be controlled to minimize the pressure on the cavity wall: (1) the amount of each portion of foamed gypsum product added to the cavity and (2) the time between adding portions of foamed gypsum product to the cavity.

First, by only filling part of a cavity at a time the amount of material expanding creates less pressure build up and gives the material space to relieve its pressure in the vertical direction. Preferably, filling to about 4 feet vertical distance allows for a minimum number of fills while keeping the wall intact. However, the vertical distance filled can range from about 6 inches to about 10 feet, preferably about 6 inches to about 6 feet, preferably about 1 foot to about 5 feet, and more preferably about 3 feet to about 4.5 feet using the current bracing system. If a more robust bracing system is used then the full height of the wall can be filled in 1 pour.

Second, the time between subsequent pours (i.e., the time between the end of a first fill and the start of the second fill) is completed is important. This time is guided by the foamed gypsum product's time to fully expand and the time needed to build a green strength. If the second fill is done during the expansion of the first fill, the second foamed gypsum product will sink below the first foamed gypsum product because the density of the second foamed gypsum product is greater than the at least partially expanded first foamed gypsum product. Further, the first foamed gypsum product will at least partially set (i.e., gain green strength) sooner because it was mixed and poured first. Therefore, the at least partially set first foamed gypsum product becomes a barrier to vertical expansion of the second poured foamed gypsum product causing pressure build up during expansion of the second foamed gypsum product, which can break the at least partially set first foamed gypsum product. If the second pour is done after the expansion of the first material but before the first material has a significant green strength then the second material will break the first material (i) as the second foamed gypsum product is poured on top of the first foamed gypsum product or (ii) during expansion of the second foamed gypsum product. However, if the second foamed gypsum product is poured after the first foamed gypsum product has been fully expanded and has significant green strength, then the second foamed gypsum product will begin expanding on top of the first foamed gypsum product and any downward pressure on the first foamed gypsum product will assist in the two separate pours joining as one unit.

For example, a method may comprise:
filling a cavity with a first foamed gypsum slurry to a first fill vertical distance within the cavity of about 6 inches to about 10 feet;
allowing the first foamed gypsum slurry in the cavity to expand and gain significant green strength harden to create a green foamed gypsum product;
making a second foamed gypsum slurry;
filling the cavity with the second foamed gypsum slurry on top of the green foamed gypsum product to a second fill vertical distance within the cavity of about 6 inches to about 10 feet; and
allowing the second foamed gypsum slurry in the cavity to expand, harden and dry.

As used herein, the fill vertical distance is defined as the vertical distance from the bottom of the fill to the top of the fill based on the volume added once expanded and dimensions of the cavity. It is not the distance from the bottom of the cavity to the top of the fill. Therefore, the first fill is measured from the bottom of the cavity to the top of the fully expanded foamed slurry, and the second fill is measured from the top of the first expanded foamed slurry surface to the top of the cavity.

Figure 7:
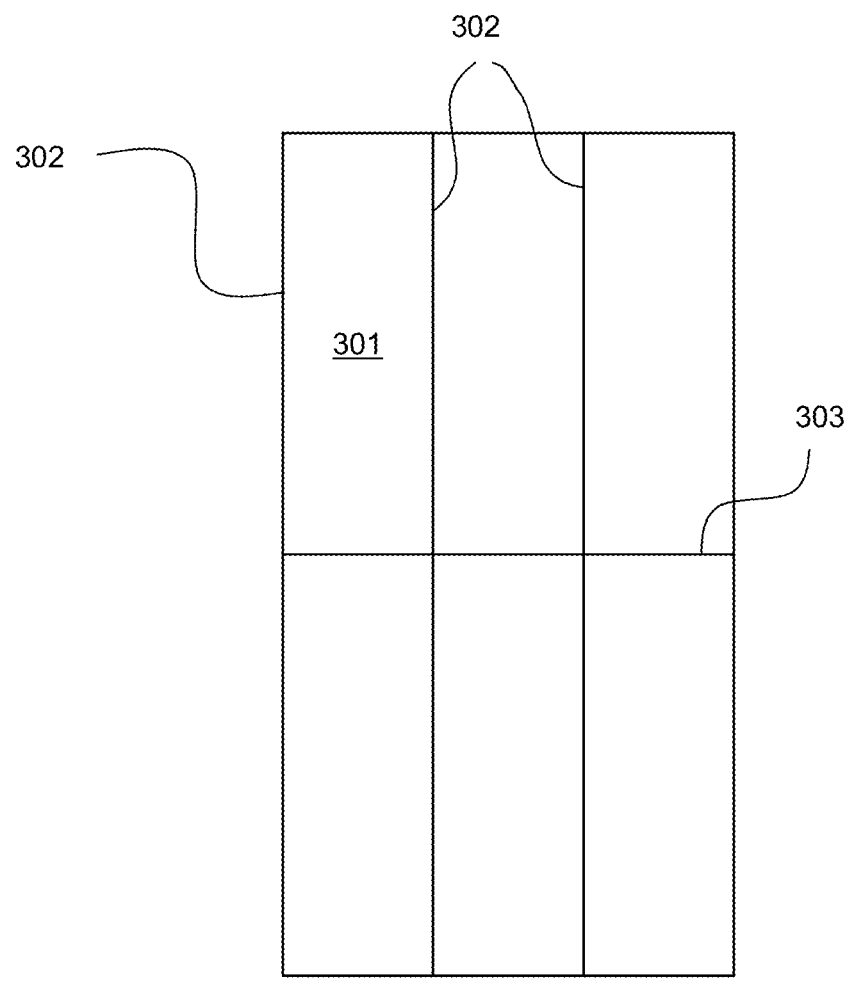
FIG. 7 is an illustration of a wall having six wallboards that are attached to studs.

Although not necessary, the cavity walls can be braced with a framework like plywood to enhance the strength of the walls of the cavity. For example, FIG. 7 is an illustration of a wall having six wallboards 301 that are attached to studs 302. The wallboards abut at joints 303. A piece of plywood would cover and support several wallboards and be screwed into the studs 302 through the wallboard 301. The plywood can be removed after fill has set.

Figure 8:
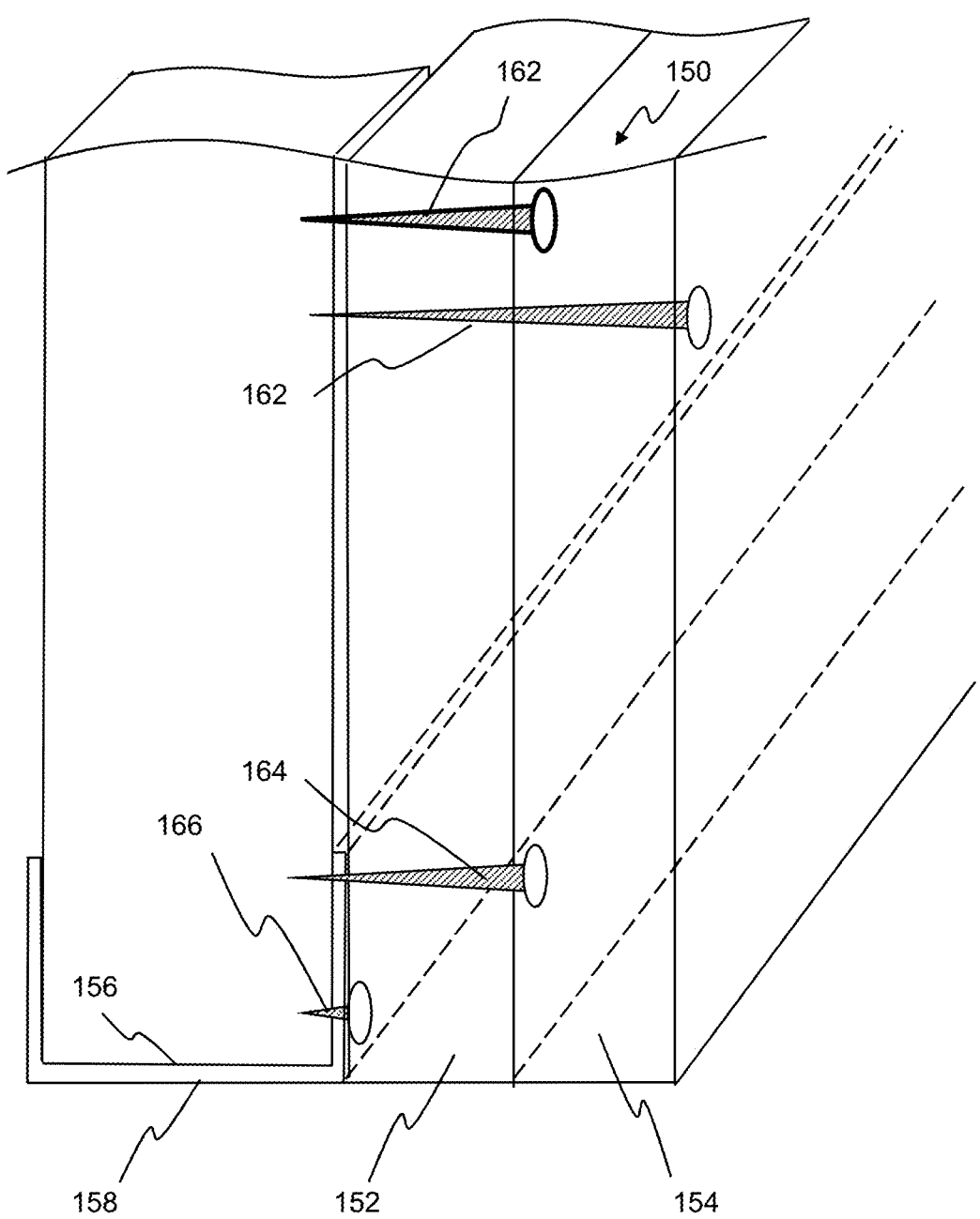
FIG. 8 is an illustration of an example of offset screwing suitable for attaching a plywood or other framework to wallboard.

FIG. 8 is an illustration of an example of offset screwing suitable for attaching a plywood or other framework to wallboard, when necessary. FIG. 8 shows a wall structure 150 including a gypsum board 152 and plywood board 154 attached to framing including a steel stud 156 and steel track 158. In wall structure 150 screws 162 in the gypsum board 152 are offset from the screws 164 in the plywood board 154 plywood board and screws 166 in the steel studs 256.

Production Parameters

One improvement to the invention is specific production parameters and how these parameters relate to ensure the foamed gypsum product mixes sufficiently and sets at the proper time.

Figure 9:
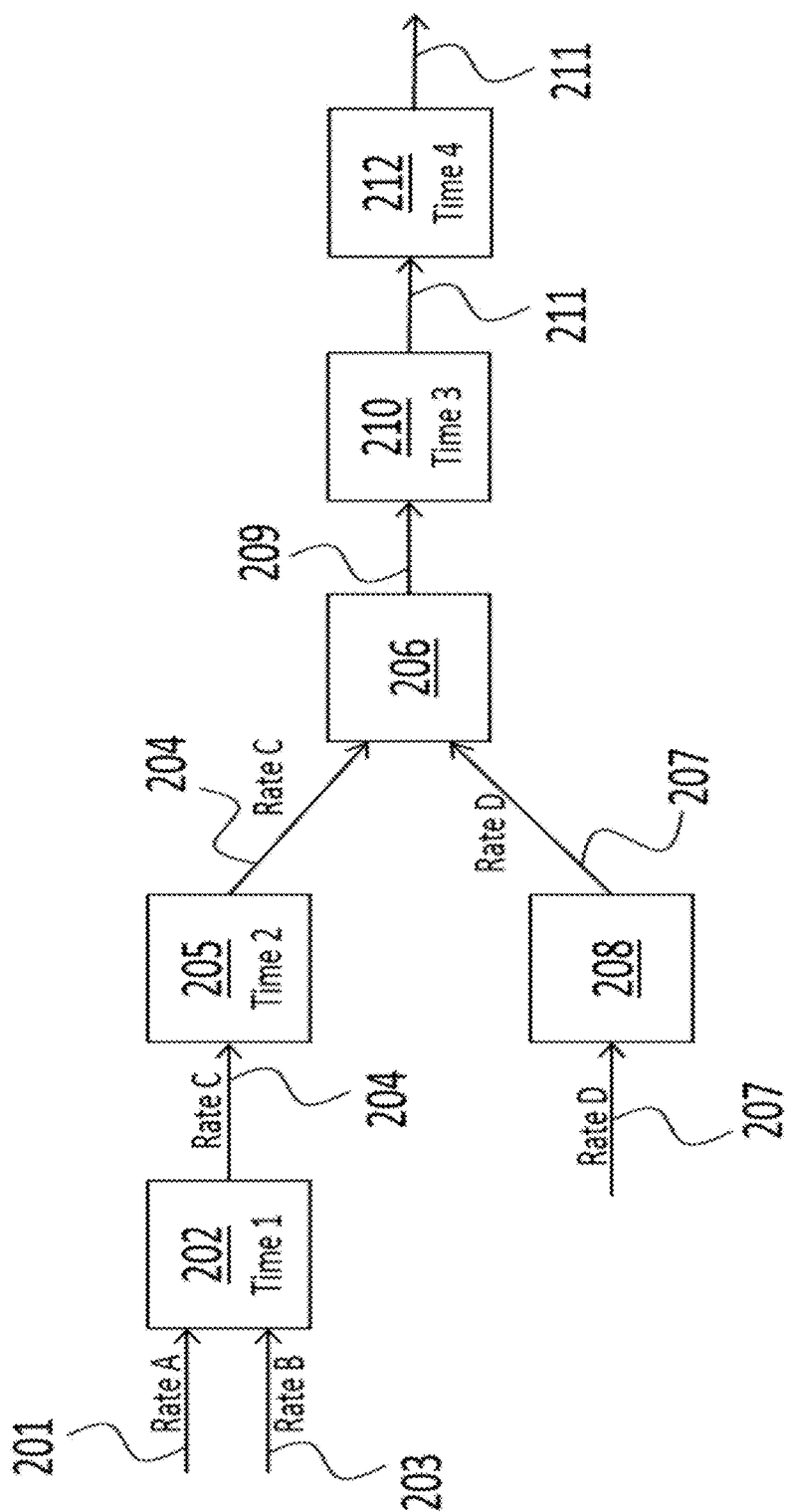
FIG. 9 illustrates the production parameters and their relationship for an example method of producing a foamed gypsum product.

FIG. 9 illustrates the production parameters and their relationship for an example method of producing a foamed gypsum product. In the illustrated example, method can be performed via batch, semi continuous batch, or continuous processing at a jobsite or as part of a manufacturing process. The example method includes the steps of:
adding calcium sulfate hemihydrate and calcium carbonate mixture 201 to a mixing chamber 202 at Rate A;
adding water 203 to the mixing chamber 202;
mixing the calcium sulfate hemihydrate and the calcium carbonate mixture 201 with water 202 in the mixing chamber 202 for Time 1 to form a first slurry 204;
passing the first slurry 204 via a first hose 205 to a Wye connector conduit 206 at Rate C, wherein the first slurry 204 has a residence time in the first hose 205 of Time 2;
passing an alum solution 207 via a second hose 208 to the Wye connector conduit 206 at Rate D;
passing the first slurry 204 and the alum solution 207 through respective inlet openings of the Wye connector conduit 206 to combine in the Wye connector conduit 206 to create a combined mixed stream 209 that discharges from the Wye connector conduit 206 through a discharge opening;

mixing the combined mixed stream 209 in a static mixer 210 for Time 3 to activate at least a portion of the calcium carbonate by reacting the portion of the calcium carbonate with an aluminum compound in the alum solution 207 to create a foamed gypsum slurry 211;

transferring the foamed gypsum slurry 211 from the static mixer 210 to a cavity between two wall boards via a third hose 212, wherein the residence time in the third hose is Time 4; and allowing the foamed gypsum slurry in the cavity to expand, harden and dry.

Alternatively, the first slurry can be produced separately and include accelerators, retarders, chelating agents, and combinations thereof to achieve a long-term (e.g., days to months), non-setting first slurry that is mixed with the alum solution in the static mixer.

The production/equipment parameters (e.g., rates and times) are interdependent. Table A is a description of the production/equipment parameters and the other production/equipment parameters on which they depend. In Table A where a Description is not provided it is because the parameter is self-explanatory. In Table A where a Function is not specified the parameter is a value not a function. For example, Rate A (e.g., 15 lbs/min also known as 15 pounds/minute) is a value the operator selects and Rate B is a function dependent therefrom.

TABLE A

Description of production/equipment parameters

| Parameter | Description | Function General | Function Specific |
|---|---|---|---|
| Rate A (RA) (lbs/min) | Rate stucco mixture injected to continuous mixing chamber | — | — |
| Rate B (RB) (lbs/min) | Rate water injected to continuous mixing chamber | f(RA) | RB = $C_1$*RA<br>$C_1$ is a constant that varies based on formulation |
| Time 1 (sec) | Residence time of first slurry in continuous mixing chamber | — | — |
| Rate C (RC) (gpm) | Rate first slurry passing through the first hose from continuous mixing chamber to Wye connector conduit | f(RA, RB) | RC = RA + RB |
| Inner diameter of the first hose ($ID_{H1}$) (innches) | — | — | — |
| Length of the first hose ($L_{H1}$) (feet) | — | — | — |
| Volumetric flow rate in the first hose ($Q_{H1}$) | — | — | — |
| Time 2 (sec) | Residence time of first slurry in the first hose | f($Q_{H1}$, $ID_{H1}$, $L_{H1}$) | T2 = $L_{H1}(\pi ID_{H1}^2/4)$/RC |

TABLE A-continued

Description of production/equipment parameters

| Parameter | Description | Function General | Function Specific |
|---|---|---|---|
| Rate D (lbs/min) | Rate of alum solution passing through the second hose to Wye connector conduit | f(RA) | RD = $C_2$*RA<br>$C_2$ is a constant that varies based on amount of desired foaming |
| Length of Wye connector conduit ($L_W$) (foot) | — | — | — |
| Inner diameter of Wye connector conduit discharge opening ($ID_{Weff}$) (in) | — | — | — |
| Time 3 (sec) | Residence time of combined mixed stream in the static mixer | f($L_W$, $ID_{Weff}$) | T3 = $L_W(\pi ID_{Weff}^2/4)$/(RC + RD) |
| Inner diameter of the third hose ($ID_{H3}$) (in) | — | — | — |
| Length of the third hose ($L_{H3}$) (ft) | — | — | — |
| Time 4 (sec) | Residence time of first slurry in the third hose | f($ID_{H3}$, $L_{H3}$) | T4 = $L_{H3}(\pi ID_{H3}^2/4)$/(RC + RD + RR) |
| Reaction rate (RR) | Reaction rate between the first slurry and the alum solution | — | — |
| Reaction kinematics (RK) (time to complete expansion, sec) | — | f(RC, RR) | — |

Note:
In this table π is the mathematical constant pi.

Reaction kinematics, as used herein, refers to the rate at which materials react to form a product, which is related to, among other things, average particle size, particle size distribution, and concentration. In this disclosure reaction kinematics is reported as the time for the reaction to complete.

The production/equipment parameters greatly impact mixing and setting time of the gypsum slurry. For example, if Rate A is too fast, residence times in the mixing chamber and the static mixer are low because each of Time 2 and Time 3 depend on Rate A (directly or indirectly through Rate C). This results in inadequate hydration of the calcium sulfate hemihydrate, which results in a lower strength final product. If Rate A is to slow, the calcium sulfate hemihydrate sets prematurely, which can be in the third hose before being placed in the cavity. In another example, if Rate B is too fast, the foam is thin causing the foam to not hold its shape in the cavity and the set product to be weak. If Rate B is too slow, the foam is thick the dry mixture does not effectively mix with the water. Further, the foam can stretch and break, which leads to collapse of the foam. In another example, if residence time in a mixer (e.g, the mixing chamber and/or static mixer) is too low and/or one or both of the first and second hoses are too short, the viscosity of the corresponding slurry can be too low causing lower expansion when foamed and causing the foam to not hold its shape in the cavity. In another example, when the Wye connector conduit is shaped such that the fluids combine side-by-side rather than the slurry coaxially surrounding the alum solution, the fluids do not mix properly due to different rheological properties, so the foam has a lower expansion and the calcium carbonate is only partially activated. Therefore, only portions of the stucco set. In another example, when the residence time in the static mixer is too high, gas is produced in the mixer, which builds up causing back pressure to the upstream components and ultimately clogs the mixer. In another example, if the third hose after the static mixer is too short, the slurry does not have time to sufficiently expand before being placed in the cavity. Therefore, significant expansion occurs in the cavity, which can create pressure on the walls of the cavity and, in some instance, break or crack the walls. If the third hose is too long, the slurry will have created too much gas in the hose, which increases the exit velocity from the third hose. Further, the slurry may not expand fully because the gas can escape the fluid matrix while still inside the hose and consolidate causing intermittent burst of slurry then gas to be expelled from the hose.

Table B provides example workable ranges for production/equipment parameters. Tables C and D provide examples of production/equipment parameter ranges that are suitable for slow flow production and fast flow production, respectively, of a foamed gypsum product that sufficiently mixes and sets at the proper time.

TABLE B

Example of production/equipment parameter ranges

| Parameter | Workable Range |
|---|---|
| RA (lbs/min) | 15-60 |
| RB (lbs/min) | 10-40 |
| Time 1 (sec) | 20-75 |
| RC (gallons per minute, gpm) | 2-10 |
| $ID_{H1}$ (in) | 0.5-2 |
| $L_{H1}$ (ft) | ≥25 |
| Time 2 (sec) | 22-100 |
| Rate D (lbs/min) | 2-15 |
| $L_W$ (ft) | 1-3 |
| $ID_{Weff}$ (in) | 0.35-0.65 |
| Time 3 (sec) | 0.005-0.040 |
| $ID_{H3}$ (in) | 0.5-2 |
| $L_{H3}$ (ft) | 8-23 |
| Time 4 (sec) | 3-15 |
| RK, time to complete expansion (sec) | 35-65 |

TABLE C

Example of production/equipment parameter ranges for slow flow production of foamed gypsum product

| Parameter | Broad Range | Useable Range | Preferred Range | Example 1 |
|---|---|---|---|---|
| RA (lbs/min) | 15-25 | 16-24 | 18-22 | 20.0 |
| RB (lbs/min) | 10-20 | 10.9-16.3 | 12.2-15 | 13.6 |
| Time 1 (sec) | 45-75 | 48-72 | 54-66 | 60 |
| RC (gallons per minute, gpm) | 2-4 | 2.1-3.2 | 2.4-2.9 | 2.7 |
| $ID_{H1}$ (in) | 0.5-2 | 1-1.5 | 1.12-1.4 | 1.25 |
| $L_{H1}$ (ft) | ≥25 | ≥50 | ≥50 | 50 |
| Time 2 (sec) | 50-100 | 60-90 | 65-75 | 71.6 |
| Rate D (lbs/min) | 2-5 | 2.8-4.2 | 3.2-3.9 | 3.5 |
| $L_W$ (ft) | 1-3 | 1.5-2.75 | 2-2.5 | 2.25 |
| $ID_{Weff}$ (in) | 0.35-0.65 | 0.4-0.6 | 0.45-0.55 | 0.5 |
| Time 3 (sec) | 0.02-0.04 | 0.025-0.035 | 0.029-0.032 | 0.031 |

TABLE C-continued

Example of production/equipment parameter ranges for slow flow production of foamed gypsum product

| Parameter | Broad Range | Useable Range | Preferred Range | Example 1 |
|---|---|---|---|---|
| $ID_{H3}$ (in) | 0.5-2 | 0.6-1.5 | 0.75-1.25 | 1 |
| $L_{H3}$ (ft) | 8-23 | 10-20 | 12-17 | 15 |
| Time 4 (sec) | 5-15 | 9.8-14.7 | 11.1-13.5 | 12 |
| RK, time to complete expansion (sec) | 35-65 | 40-60 | 45-55 | 50 |

TABLE D

Example of production/equipment parameter ranges for fast flow production of foamed gypsum product

| Parameter | Broad Range | Useable Range | Preferred Range | Example 2 |
|---|---|---|---|---|
| RA (lbs/min) | 35-60 | 37.6-56.4 | 42.3-51.7 | 47.0 |
| RB (lbs/min) | 25-40 | 25.6-38.4 | 28.8-35.2 | 32.0 |
| Time 1 (sec) | 20-35 | 20.4-30.6 | 23-28.1 | 26 |
| RC (gpm) | 5-10 | 5-7.5 | 5.7-6.9 | 6.3 |
| $ID_{H1}$ (in) | 0.5-2 | 1-1.5 | 1.12-1.4 | 1.25 |
| $L_{H1}$ (ft) | ≥25 | ≥50 | ≥50 | 50 |
| Time 2 (sec) | 22-38 | 25-35 | 27-33 | 30.5 |
| Rate D (lbs/min) | 5-15 | 7.8-11.6 | 8.7-10.7 | 9.7 |
| $L_W$ (ft) | 1-3 | 1.5-2.75 | 2-2.5 | 2.25 |
| $ID_{Weff}$ (in) | 0.35-0.65 | 0.4-0.6 | 0.45-0.55 | 0.5 |
| Time 3 (sec) | 0.005-0.025 | 0.005-0.020 | 0.010-0.015 | 0.013 |
| $ID_{H3}$ (in) | 0.5-2 | 0.6-1.5 | 0.75-1.25 | 1 |
| $L_{H3}$ (ft) | 8-23 | 10-20 | 12-17 | 15 |
| Time 4 (sec) | 3-10 | 4.1-6.2 | 4.6-5.6 | 5 |
| RK, time to complete expansion (sec) | 35-65 | 40-60 | 45-55 | 50 |

As discussed above, adjusting the production/equipment parameters can be useful in controlling when and where the slurry foams and sets. Additionally, when and where the slurry foams and sets can be controlled by including a combination of accelerators, retarders, chelating agents, and combinations thereof with the calcium sulfate hemihydrate and calcium carbonate mixture. For example, the production/equipment parameters and/or additional chemical components can be used to achieve set times of minutes to days to months.

Control of when and where the slurry foams and sets allows for using the invention in several situations and applications. For example, a foamed gypsum slurry formulated to expand after exiting the hose can be useful: (I) to break or frack a solid material or assembly, (II) if the formwork strength is significant, (III) if a cavity has a wide bottom with narrow opening for filling of cavity, (IV) if the opening of a cavity is on the side, (V) if a flowing foamed gypsum slurry is required for unusual cavity shapes, (VI) if flowing foamed gypsum slurry is required for tight cavities, and combinations thereof. In another example, foamed gypsum slurry formulated to expand while in the hose can be useful for: (I) spraying applications, (II) texture applications, (III) far reaching surfaces, (IV) encasing applications, (V) volume adding applications, and combinations thereof.

Calcined Gypsum

As used herein, the term "calcined gypsum" is intended to mean alpha calcium sulfate hemihydrate, beta calcium sulfate hemihydrate, water-soluble calcium sulfate anhydrite, or mixtures of any or all thereof. Calcined gypsum is also known as stucco. The terms "gypsum", "set gypsum" and "hydrated gypsum" are intended to mean calcium sulfate dihydrate. The water in the mixture reacts spontaneously with the calcined gypsum to form set gypsum.

The calcined gypsum employed in the invention can be in the form and concentrations typically found useful in the corresponding embodiments of the prior art. It can be from natural or synthetic sources. The calcined gypsum can be fibrous in some embodiments and non-fibrous in others. Any form of calcined gypsum may be used, including but not limited to alpha or beta stucco. However, alpha calcium sulfate hemihydrate is preferably employed for its yield of set gypsum having relatively high strength. If desired beta calcium sulfate hemihydrate or a mixture of beta calcium sulfate hemihydrate and water-soluble calcium sulfate anhydrite are employed. The calcined gypsum can include at least about 50% beta calcium sulfate hemihydrate. In other embodiments, the calcined gypsum can include at least about 86% beta calcium sulfate hemihydrate. Use of calcium sulfate anhydrite, synthetic gypsum or landplaster is also contemplated, although preferably in small amounts of less than 20%.

Calcium Carbonate

Calcium carbonate is a chemical compound with the formula $CaCO_3$.

Aluminum Compound

The aluminum compound is selected from the group consisting of aluminum sulfate with the formula $Al_2(SO_4)_3$ and potassium aluminum sulfate, preferably it is aluminum sulfate.

Water

Water is added to the slurry in any amount that makes flowable slurry. The amount of water to be used varies greatly per the application with which it is being used, the exact dispersant being used, the properties of the stucco and the additives being used. The water to calcium sulfate hemihydrates weight ratio to 0.2-2:1.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical, preferably potable water.

Latex

The gypsum slurry of the present invention may comprise a latex polymer as a binder. In particular, the polymer is synthetic latex (i.e., an aqueous dispersion of polymer particles prepared by emulsion polymerization of one or more monomers).

The latex comprises an aqueous emulsion or dispersion comprising water, the latex polymer, surfactant, and other ingredients as described elsewhere in the present specification. In the alternative the latex polymer may be added as a dry re-dispersible power.

The latex polymer is selected from at least one member of the group consisting of polyvinyl acetate latex, polyvinyl acrylate and polyvinyl chloride latex, acrylics, styrene acrylics, acrylic esters, vinyl acrylics, vinyl chloride, vinyl chloride acrylic, styrene acetate acrylics, ethylene polyvinyl acetate, styrene butadiene, and combinations thereof, and surfactant, preferably the latex polymer is selected from at least one member of the group consisting of polyvinyl acetate latex, polyvinyl acrylate and polyvinyl chloride latex, more preferably the latex polymer comprises polyvinyl acetate latex.

Methods for preparing synthetic latexes are well known in the art and any of these procedures can be used.

Particle size of the latex typically varies from 30 nm to 1500 nm.

Dispersant for the Gypsum Slurries

Dispersants are known for use with gypsum in gypsum slurries to help fluidize the mixture of water and calcium sulfate hemihydrate so less water is needed to make flowable slurry.

The gypsum slurries typically contain a dispersant such as polynaphthalene sulfonate. Polynaphthalene sulfonate dispersants are well known and relatively cheaper, but have limited efficacy. Polynaphthalene sulfonate has good compatibility with starch, foaming agents, and clays. A production process for polynaphthalene sulfonates includes the following reaction steps: sulfonation of naphthalene with sulfuric acid producing b-naphthalene-sulfonic acid, condensation of b-naphthalene sulfonic acid with formaldehyde producing polymethylene naphthalene sulfonic acid, and neutralization of polymethylene naphthalene sulfonic acid with sodium hydroxide or another hydroxide.

Polycarboxylate dispersants are suitable dispersants for gypsum slurries. Preferred polycarboxylate dispersants for gypsum slurries comprise a polycarboxylic ether dispersant, for example dispersant comprising a copolymer of an oxyalkylene-alkyl ether and an unsaturated dicarboxylic acid. Preferably the polycarboxylate dispersant comprises a copolymer of an oxyalkylene-alkyl ether and an unsaturated dicarboxylic acid.

U.S. Pat. No. 7,767,019 to Liu et al, incorporated by reference, discloses embodiments of branched polycarboxylates suitable for use as dispersants for the present gypsum slurries. These are also anionic surfactants. Liu et al discloses polycarboxylate dispersant consisting essentially of a first and a second repeating unit, wherein the first repeating unit is an olefinic unsaturated mono-carboxylic acid repeating unit or an ester or salt thereof, or an olefinic unsaturated sulphuric acid repeating unit or a salt thereof, and the second repeating unit is of the general formula (I)

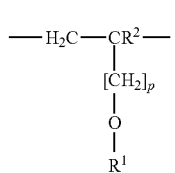

where $R^1$ is represented by formula (II):

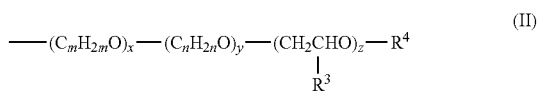

and wherein $R^2$ is hydrogen or an aliphatic $C_1$ to $C_5$ hydrocarbon group, $R^3$ is a non-substituted or substituted aryl group, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to one of the formulae (III):

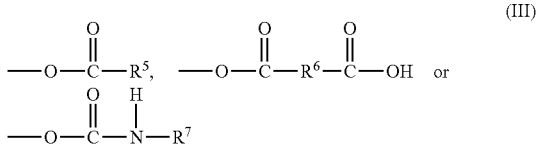

(III)

wherein $R_5$ and $R_7$, independently of each other, represent an alkyl, aryl, aralkyl or alkylaryl group and $R_6$ is a divalent alkyl, aryl, aralkyl or alkaryl group, p is 0 to 3, inclusive, m and n are, independently, an integer from 2 to 4, inclusive; x and y are, independently, integers from 55 to 350, inclusive and z is from 0 to 200, inclusive.

U.S. Pat. No. 8,142,915 to Blackburn et al, incorporated by reference, also discloses embodiments of polycarboxylates suitable for use as dispersants for the present gypsum slurries.

Preferably the naphthalene dispersant is selected from at least one of beta-naphthalene sulfonate, naphthalene sulfonate formaldehyde condensate and sodium naphthalene sulfate formaldehyde condensate.

Preferably the polyphosphate dispersant is selected from at least one member of the group consisting of sodium trimetaphosphate (STMP), sodium tripolyphosphate (STPP), potassium tripolyphosphate (KTPP), tetrasodium pyrophosphate (TSPP), and tetrapotassium pyrophosphate (TKPP), more preferably the polyphosphate dispersant is sodium trimetaphosphate (STMP) or tetrasodium pyrophosphate (TSPP), most preferably the polyphosphate dispersant comprises sodium trimetaphosphate (STMP).

In addition, suitable amino alcohols, such as, for example, 2-amino-2-methylpropanol, may be used as dispersants.

Additives for Gypsum Slurries

Additives can be employed in the gypsum slurries to impart desirable properties and to facilitate manufacturing, such as set accelerators, set retarders, recalcination inhibitors, binders, adhesives, dispersants, leveling or non-leveling agents, thickeners, bactericides, fungicides, pH adjusters, colorants, reinforcing materials, fire retardants, water repellants, fillers and mixtures thereof.

The gypsum slurry also optionally includes one or more modifiers that enhance the ability of the dispersant to fluidize the slurry, thus improving its efficacy.

Preferred modifiers include lime, also known as quicklime or calcium oxide, slaked lime, also known as calcium hydroxide, soda ash, also known a sodium carbonate, and other carbonates, silicates, phosphonates and phosphates. Dosage of the modifier is from 0.05% to about 1% depending on the modifier being used and the application with which it is used. Additional information on modifiers and their use is found in U.S. Published Patent Application No. US 2006-0280898 A1, entitled "Modifiers for Gypsum Slurries and Method of Using Them", incorporated by reference.

Preferably both the modifier and the dispersant are in dry form, they can be pre-blended with each other and added with the stucco. A method for adding dispersants and modifiers to a stucco composition is disclosed in more detail in US 2006-0280898 A1, entitled "Modifiers for Gypsum Slurries and Method of Using Them", incorporated by reference.

Additional additives are also added to the slurry as are typical for the application to which the gypsum slurry will be put. Set retarders or dry accelerators are added to modify the rate at which the hydration reactions take place. Climate stabilized accelerator ("CSA") is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. Heat Resistant Accelerator (HRA) is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both are preferred accelerators.

Another accelerator, known as wet gypsum accelerator (WGA), is also a preferred accelerator. A description of the use of and a method for making wet gypsum accelerator are disclosed in U.S. Pat. No. 6,409,825, herein incorporated by reference. WGA includes particles of calcium sulfate dihydrate, water, and at least one additive selected from the group consisting of (i) an organic phosphonic compound, (ii) a phosphate-containing compound, or (iii) a mixture of (i) and (ii). This accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

Other potential additives to the invention are biocides and/or fungicides to reduce growth of mold, mildew or fungi. Depending on the biocide selected and the intended use for the cavity filling, the biocide can be added to the covering, the gypsum core or both. Examples of biocides include boric acid, pyrithione salts and copper salts. Biocides can be added to the gypsum slurry.

Glass fibers are optionally added to the slurry. Paper fibers are optionally added to the slurry. Wax emulsions or polysiloxanes are optionally added to the gypsum slurry to improve the water-resistance of the finished gypsum product. If stiffness is needed, boric acid is commonly added. Fire retardancy can be improved by the addition of vermiculite. These and other known additives are useful in the present slurry formulations.

The gypsum slurry may include starches to strengthen the product. Typical starches are corn starch, wheat starch, and potato starch. The starch may be a pregelatinized starch or an acid modified starch. One of ordinary skill in the art will appreciate methods of pregelatinizing raw starch, such as, for example, cooking raw starch in water at temperatures of at least about 185° F. (85° C.) or other methods. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Foaming Agent

Foaming agents can be employed in the gypsum slurries to produce additional foam to supplement the internally generated foam generated by an internal chemical reaction. These foaming agents may be any of the conventional foaming agents known to be useful in preparing foamed set gypsum products. Many such foaming agents are well known and readily available commercially, e.g., soap.

Preferably the foaming agent is selected from the group consisting of alkyl benzene sulfonate, fatty acid salts, sodium lauryl sulfate, alkyl sulfate salts, sodium lauryl ether sulfate, sodium alkyl ether sulfate, (sodium C14-16 olefin sulfonate, alpha-olefin sulfonates, phosphate esters, sulphosuccinates, alkyl phenol ether sulfates, and isethionates. More preferably alpha-olefin sulfonate, alkyl sulfonates, alkylbenzolsulfonates and alkyl ether sulfate oligomers. Furthermore, preferably at least one member of the group consisting of sodium lauryl ether sulfate, ammonium C10-C12 alcohol ether sulfate, sodium C14-16 olefin sulfonate, and sodium polypropoxy-polyethoxy-decyl sulfate (molecular formula $C_{10}H_{22}$—$O(C_3H_6$—$OC_2H_4$—$O)_x$—$H_2SO_4$—Na). Most preferably a mixture comprising 20 to 25% butyl diglycol, 7 to 15% sodium lauryl ether sulfate, and 3 to 5% alcohols C10-C16.

An example of one type of foaming agent has the formula $ROSO_3^-M^+$, wherein R is an alkyl group containing from 2 to 20 carbon atoms, and M is a cation. Preferably, R is an alkyl group containing from 8 to 12 carbon atoms. An example of one type of foaming agent, useful to generate stable foams, has the formula $CH_3(CH_2)_xCH_2(OCH_2CH_2)_y OSO_3^-M^+$, wherein X is a number from 2 to 20, Y is a number from 0 to 10 and is greater than 0 in at least 50 weight percent of the foaming agent, and M is a cation. Blends of these foaming agents may also be employed.

Polyvinyl alcohol (PVOH) may be added to the slurry as a foam stabilizing agent before the foam was generated in the cementitious slurry.

Additives

Additives which can be employed in the slurry in the practice of the invention to impart desirable properties and to facilitate manufacturing are selected from one or more members of the group silicon based defoamers, acrylate thickeners, cellulose thickeners, inorganic filler powder, pH adjuster, preferably alkanolamines, and pigments as well as the abovementioned dispersant.

The compositions of the invention comprise clay and/or an inorganic filler powder such as calcium sulfate dihydrate.

The clay may be calcined or not calcined. The term "calcined clays" is to be understood as clays having been submitted to a thermal treatment, e.g., heated, to drive off volatile compounds. Representative clays include, but are not limited to attapulgite, montmorillonite, nontronite, beidellite, volkonskoite, hectorite, saponite, sauconite; vermiculite; halloisite; sericite; or their mixtures.

The thickener is selected from at least one member of the group consisting of a cellulose thickener and an acrylate thickener. Preferred cellulose thickeners include hydroxy propyl methyl cellulose, hydroxy ethyl methyl cellulose, hydroxy ethyl cellulose, methyl cellulose, methyl ethyl cellulose, ethyl cellulose, and carboxy methyl cellulose, most preferably comprising hydroxy propyl methyl cellulose. The most preferred cellulose thickener is hydroxy methyl propyl cellulose.

Other potential thickeners are casein, gum arabic, guar gum, tragacanth gum, starch, sodium alginate.

Preferred acrylate thickeners are selected from one or more of sodium polyacrylates, water-soluble copolymers based on acrylic and (meth)acrylic acid, such as acrylic acid/acrylamide and (meth)acrylic acid/acrylic ester copolymers.

Also, the coating compositions may include thickeners selected from polyvinyl alcohol, associative thickeners, such as styrene/maleic anhydride polymers or preferably hydrophobically modified polyetherurethanes (HEUR) known to a person skilled in the art, hydrophobically modified acrylic acid copolymers (HASE) and polyetherpolyols.

Alkaline organic and/or alkaline inorganic compounds are suitable as neutralizing agents. Also preferred in addition to aqueous ammonia solutions are volatile primary, secondary and tertiary amines, such as ethylamine, dimethylamine, dimethylethanolamine, triethylamine, morpholine, piperidine, diethanolamine, triethanolamine, diisopropylamine, 2-amino-2-methylpropanol, 2-N,N-dimethylamino-2-methyl-propanol and mixtures of these compounds.

The slurry may contain silicone based defoamer. A defoamer or an anti-foaming agent is a chemical additive that reduces and hinders the formation of foam in industrial process liquids. The terms anti-foaming agent and defoamer are often used interchangeably. Commonly used agents are polydimethylsiloxanes and other silicones. The additive is used to prevent formation of foam or is added to break a foam already formed. Silicone-based defoamers are polymers with silicon backbones. The silicone compound consists of hydrophobic silica dispersed in a silicone oil. Emulsifiers are added to ensure the silicone spreads fast and well in the foaming medium. The silicone compound might also contain silicone glycols and other modified silicone fluids. Polydimethylsiloxane is a preferred antifoaming agent.

The slurry may contain pigment. Pigments which may be used are all pigments known to a person skilled in the art for the intended use. Preferred pigments for the aqueous formulations according to the invention are, for example, titanium dioxide, preferably in the form of rutile, barium sulfate, zinc oxide, zinc sulfide, basic lead carbonate, antimony trioxide and lithopone (zinc sulfide and barium sulfate). However, the aqueous formulations can also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the formulations according to the invention may also contain organic colored pigments, for example sepia, gamboge, Kasset brown, toluidine red, para red, Hansa yellow, indigo, azo dyes, anthraquinoid and indigoid dyes and dioxazine, quinacridone, phthalocyanine, isoindolinone and metal complex pigments. Titanium dioxide is a preferred pigment.

Slurry may also contain lightweight fillers such as perlite or polystyrene.

Slurry may contain pH modifiers such as magnesium hydroxide.

The following examples are presented to further illustrate some preferred embodiments of the invention and to compare them with methods and compositions outside the scope of the invention. Unless otherwise indicated, concentrations of materials in compositions and mixtures are given in percent by weight based upon the weight of calcined gypsum present.

Example 1—Specific Example of Wall Creation

One specific process of slurry creation, alum solution creation, pumping, and mixing system that was used to create a foamed gypsum wall is the following using a formulation of ingredients listed in TABLE E. All percentages are weight percentages on a dry (water free) basis. The material was formulated to adhere to different substrates such as gypsum board, gypsum fiber board, glass mat sheathing, and cement board.

TABLE E

List of typical ingredients in the formulation with the maximum and minimum values that could be used to make a foamed gypsum material.

| Chemical name | Max % | Min % |
|---|---|---|
| Alpha and beta calcium sulfate hemihydrate | 98% | 50% |
| Calcium carbonate | 50% | 1% |
| Sodium citrate | 2% | 0% |
| Climate Stabilized Accelerator | 2% | 0% |
| Hydroxy methyl propyl cellulose | 5% | 0% |
| Hydroxy methyl ethyl cellulose | 5% | 0% |
| Acrylic latex (45% solid) | 20% | 0% |
| Foaming agent* | 5% | 0% |
| Styrene butadiene latex | 20% | 0% |
| Polycarboxylic ether | 5% | 0% |
| Amino methyl propanol | 1% | 0% |
| Calcium hydroxide | 1% | 0% |
| Tetrasodium pyrophosphate | 2% | 0% |
| Sodium polyacrylate | 2% | 0% |
| Citric acid | 1% | 0% |
| Diethylene triamine pentaacetic acid | 1% | 0% |
| Aluminum sulfate | 30% | 1% |
| Sodium trimetaphosphate | 2% | 0% |
| Water (g/100 g solids) | 200 | 30 |

*foaming agent was a mixture comprising 20 to 25% butyl diglycol, 7 to 15% sodium lauryl ether sulfate, and 3 to 5% alcohols C10-C16

Three different processes can be performed to fill a cavity between wallboards with the foamed slurries described herein as follows. For the following examples, Process 2 was used.

Process 1:
Dry materials were blended, packaged, and slurried in a batch process
Alum solution was created by mixing dry alum and water
The two solutions were pumped and combined via wye connector
The two solutions were mixed using a static mixer
The resulting mixed foaming solution was then transferred to a cavity
The material entering the cavity has ranged from having no expansion to completely expanded
The material in the cavity hardened and dried Process 2:
Dry materials were blended, packaged
The packaged material was slurried in a continuous process
Alum solution was procured
The two solutions were pumped and combined via wye connector
The two solutions were mixed using a static mixer
The resulting mixed foaming solution was then transferred to a cavity
The material entering the cavity has ranged from having no expansion to completely expanded
The material in the cavity hardened and dried Process 3:
Dry materials were blended, packaged
The packaged material was slurried in a continuous process
Alum solution was procured
The two solutions were fed into a dynamic mixer
The resulting mixed foaming solution was then transferred to a cavity
The material entering the cavity has ranged from having no expansion to completely expanded
The material in the cavity hardened and dried Employing the composition of the present invention in the Processes 1, 2 and 3 expanded to fill the cavity.

Examples of foamed slurry compositions are provided in TABLE F. All values are weight percent of the dry (water free) ingredients unless otherwise specified.

TABLE F

Examples of foamed slurry compositions

| Sample | Calcium sulfate hemihydrate | CaCO$_3$* | Sodium Citrate | CSA | HPMC | HEMC | Na-PCE** | pH modifier | Aluminum Sulfate | Water (g/100 g solids) | Density pcf |
|---|---|---|---|---|---|---|---|---|---|---|---|
| A | 91.0 | 5.0 | | | | | | | 4.00 | 55 | 54 |
| B | 89.5 | 5.0 | | | 0.50 | | 1.0 | 0.01 | 4.00 | 75 | 17 |
| C | 89.2 | 5.0 | 0.1 | 0.2 | 0.50 | | 1.0 | 0.01 | 4.00 | 80 | 18 |
| D | 88.0 | 6.0 | 0.1 | 0.2 | 0.25 | | 0.5 | 0.01 | 5.00 | 75 | 16 |
| E | 87.5 | 6.0 | 0.1 | 0.2 | 0.25 | | 1.0 | 0.01 | 5.00 | 65 | 19 |
| F | 87.0 | 6.0 | 0.1 | 0.2 | 0.25 | | 1.5 | 0.01 | 5.00 | 60 | 20 |
| G | 87.7 | 6.0 | 0.1 | 0.2 | 0.50 | | 0.5 | 0.01 | 5.00 | 75 | 15 |
| H | 87.2 | 6.0 | 0.1 | 0.2 | 0.50 | | 1.0 | 0.01 | 5.00 | 70 | 14 |
| I | 86.7 | 6.0 | 0.1 | 0.2 | 0.50 | | 1.5 | 0.01 | 5.00 | 70 | 16 |
| J | 87.5 | 6.0 | 0.1 | 0.2 | 0.75 | | 0.5 | 0.01 | 5.00 | 80 | 15 |
| K | 87.0 | 6.0 | 0.1 | 0.2 | 0.75 | | 1.0 | 0.01 | 5.00 | 80 | 15 |
| L | 74.1 | 24.7 | | | | | | | 1.23 | 50 | 88 |
| M | 74.1 | 24.7 | | | | | | | 1.23 | 50 | 85 |
| N | 74.1 | 24.7 | | | | | | | 1.23 | 50 | 87 |
| O | 49.3 | 49.3 | | | | | | | 1.48 | 90 | 66 |
| P | 85.8 | 12.9 | | | | | | | 1.29 | 50 | 74 |
| Q | 74.1 | 24.7 | | | | | | | 1.23 | 72 | 66 |
| R | 85.8 | 12.9 | | | | | | | 1.29 | 50 | 78 |
| S | 85.8 | 12.9 | | | | | | | 1.29 | 50 | 78 |
| T | 85.8 | 12.9 | | | | | | | 1.29 | 50 | 82 |
| U | 74.1 | 24.7 | | | | | | | 1.23 | 72 | 72 |
| V | 74.1 | 24.7 | | | | | | | 1.23 | 72 | 70 |
| W | 74.1 | 24.7 | | | | | | | 1.23 | 72 | 70 |
| AA | 89.9 | 6.1 | | | | | | | 4.04 | 56 | 73 |

TABLE F-continued

Examples of foamed slurry compositions

| Sample | Calcium sulfate hemi-hydrate | CaCO$_3$* | Sodium Citrate | CSA | HPMC | HEMC | Na-PCE** | pH modifier | Aluminum Sulfate | Water (g/ 100 g solids) | Density pcf |
|---|---|---|---|---|---|---|---|---|---|---|---|
| AB | 93.8 | 4.0 | | | | 0.25 | | | 2.00 | 56 | 62 |
| AC | 92.3 | 4.0 | | | | 0.25 | | | 3.50 | 56 | 54 |
| AD | 90.8 | 4.0 | | | | 0.25 | | | 5.00 | 70 | 51 |

*Calcium carbonate
**Sodium polycarboxylate ether

TABLE F shows that a wide range of densities can be produced based on water amount, cellulosic thickener amount, and the amount of reactants.

Formulations of comparative examples of slurry compositions (non-activated) and their set times are provided in Table F1. All values are weight percent of the dry (water free) ingredients unless otherwise specified.

TABLE F1

Comparative Examples of Slurry Compositions (not activated)

| Calcium sulfate hemi-hydrate | Calcium carbonate | Sodium Citrate | CSA | HEMC | Sodium poly-carboxylate ether | Sodium poly-acrylate | Water (g/ 100 g solids) | Slurry set time (days) |
|---|---|---|---|---|---|---|---|---|
| 87.64 | 11.11 | 0.15 | 0.25 | 0.50 | 0.35 | 0.00 | 65 | 0.0 |
| 87.64 | 11.11 | 0.05 | 0.25 | 0.50 | 0.35 | 0.10 | 65 | 0.5 |
| 87.54 | 11.11 | 0.05 | 0.35 | 0.50 | 0.35 | 0.10 | 65 | 0.5 |
| 87.44 | 11.11 | 0.15 | 0.35 | 0.50 | 0.35 | 0.10 | 65 | 0.5 |
| 87.44 | 11.11 | 0.25 | 0.25 | 0.50 | 0.35 | 0.10 | 65 | 0.5 |
| 87.34 | 11.11 | 0.25 | 0.35 | 0.50 | 0.35 | 0.10 | 65 | 0.5 |
| 87.54 | 11.11 | 0.15 | 0.25 | 0.50 | 0.35 | 0.10 | 65 | 1.0 |
| 87.64 | 11.11 | 0.15 | 0.15 | 0.50 | 0.35 | 0.10 | 65 | 1.5 |
| 87.44 | 11.11 | 0.15 | 0.25 | 0.50 | 0.35 | 0.20 | 65 | 20.0 |
| 87.34 | 11.11 | 0.05 | 0.35 | 0.50 | 0.35 | 0.30 | 65 | 42.0 |
| 87.44 | 11.11 | 0.05 | 0.25 | 0.50 | 0.35 | 0.30 | 65 | 61.0 |
| 87.24 | 11.11 | 0.15 | 0.35 | 0.50 | 0.35 | 0.30 | 65 | 61.0 |
| 87.34 | 11.11 | 0.15 | 0.25 | 0.50 | 0.35 | 0.30 | 65 | 96.0 |
| 87.14 | 11.11 | 0.25 | 0.35 | 0.50 | 0.35 | 0.30 | 65 | 96.0 |
| 87.54 | 11.11 | 0.05 | 0.15 | 0.50 | 0.35 | 0.30 | 65 | 110.0 |
| 87.24 | 11.11 | 0.25 | 0.25 | 0.50 | 0.35 | 0.30 | 65 | 110.0 |
| 87.44 | 11.11 | 0.15 | 0.15 | 0.50 | 0.35 | 0.30 | 65 | 142.0 |

TABLE F1 shows slurries made without the aluminum sulfate for activation set in under 18 hours to 142 days. This slurry set time can be extended further if needed. All samples were activated with an alum to dry powder weight ratio of 1:10 which achieves a final density of 14-17 pcf (pound per cubic foot). This shows that the formulation can be modified for the different use applications. If dry material is mixed and used immediately then small amounts of sodium polyacrylate are necessary. If the dry material is to be made and stored in a wet state then higher amounts of sodium polyacrylate are necessary. The amount of sodium polyacrylate in the tested range has no effect on the final product. Small changes in CSA and sodium citrate alter the set time of the activated material between 5 to 7.5 min.

Example 2

This example illustrates the interrelation of Rate A, Rate B, and the first hose parameters from FIG. 9. Samples S1-S8 were formulations falling within the composition of Table E. S1, S2, S3, and S4 were made with a higher water to powder ratio than is recommended for the formulation. Comparing S1 and S2 shows that slowing rate A and rate B results in longer residence time in the hose providing time for the rheological modifiers to hydrate. Comparing S1 and S3 shows that lengthening the hose provides an even longer residence time providing more time for the rheological modifiers to hydrate. Comparing S3 and S4 shows that more residence time is unnecessary because the modifiers are fully hydrated. Furthermore, S4 showed poor slurry mixing results because chunks of unmixed powder were found exiting the hose whereas S3 had a smooth slurry exiting the hose. Comparing S1 and S5 shows that a higher viscosity can be achieved, even with shorter residence time, if a lower water to powder ratio is used. Comparing S5 and S6 again shows that slowing the feed rates of A and B results in a lower residence time in the hose providing time for the rheological modifiers to hydrate. Comparing S5 and S7 again shows that lengthening the hose provides an even longer residence time providing more time for the rheological modifiers to hydrate. Comparing S5 and S8 again shows that lowering the water can result in making the viscosity too high for use as a foaming material.

TABLE G

Interrelation of Rate A, Rate B, and the first hose parameters

| Sample | Pump setting | Rate B (lbs/min) | Rate A (lbs/min) | Rate C (gpm) | First Hose Length (ft) | First Hose Residence Time (min) | Viscosity (3/8 inch flag at 75 rpm) |
|---|---|---|---|---|---|---|---|
| S1 | 3.00 | 14.2 | 20.0 | 2.5 | 25 | 0.64 | 118 |
| S2 | 3.00 | 12.1 | 15.7 | 2.2 | 25 | 0.72 | 171 |
| S3 | 3.25 | 14.2 | 20.7 | 2.8 | 50 | 1.15 | 380 |
| S4 | 1.50 | 8.3 | 12.3 | 1.6 | 50 | 1.95 | 384 |
| S5 | 3.50 | 13.3 | 20.1 | 2.7 | 25 | 0.60 | 385 |
| S6 | 2.50 | 10.8 | 16.2 | 2.2 | 25 | 0.74 | 429 |
| S7 | 3.25 | 13.3 | 19.7 | 2.6 | 50 | 1.21 | 453 |
| S8 | 3.00 | 12.5 | 20.6 | 2.6 | 25 | 0.61 | 789 |

Example 3

This example illustrates how viscosity and mixing effect foaming. Samples S9-S14 were formulations falling within the composition of Table E. S9 is the same as the example in the usable range chart and is the control sample. S10 had too high of a viscosity which didn't allow the material to expand correctly which resulted gas being released at the surface because the surface film is prone to cracking at high viscosity. The less water allowed the reaction kinematics to occur faster resulting in a faster set time. S11 viscosity was low allowing the bubbles to rise to the surface and not having a surface film form allowed the gas to be released. The more water caused the reaction kinematics to occur slower resulting in a slower set time. S12 was created using a poorly mixed slurry. The viscosity and expansion of the material agreed with the control because the rheological modifiers were at the same concentration but the stucco was not properly dispersed which resulted in poor reaction kinematics which is shown by the longer set time. S13 was created with poorly mixed slurry and inefficient mixing of the activator. The poorly mixed slurry resulted in a slightly lower viscosity and the inefficient mixing of the activator resulted in much lower than expected expansion and the combination of poorly mixed slurry and inefficient activator mixing resulted in a much longer set time. S14 was created with a correctly mixed slurry and inefficient activator mixing. The viscosity was slightly lower but the inefficient activator mixing resulted in a lower than expected viscosity and a longer set time.

TABLE H

Viscosity and mixing effect on foaming

| Sample | Water/Dry powder wt. ratio | Dry Activator/ Powder wt. ratio | Viscosity (Brabender units (BU)) | Expansion (vol. %) | Vicat Set Time (minutes)* |
|---|---|---|---|---|---|
| S9 | 0.70 | 10% | 313 | 7.1 | 8:00 |
| S10 | 0.60 | 10% | 749 | 6.1 | 7:15 |
| S11 | 0.80 | 11% | 138 | 6.4 | 9:30 |
| S12 | 0.70 | 10% | 282 | 7.1 | 8:45 |
| S13 | 0.70 | 10% | 247 | 4.1 | 11:00 |
| S14 | 0.70 | 10% | 267 | 5.4 | 9:15 |

*The compositions of this invention final setting time when measured in accordance to ASTM C191-13 - Standard Test Methods for Time of Setting of Hydraulic Cement by Vicat Needle.

Example 4

This example illustrates how the static mixer can affect the efficiency of the mixing between the slurry and the activator. The number of elements refers to the number of fins that the material flows around inside the static mixer. The mixers only come in two sizes, 12 and 6, so combinations were used to create different lengths of mixing. Table I shows that a 12+6 combination produces the most efficient mix by delivering the lowest density product or the most expanded product.

TABLE I

Static mixer configuration effect on mixing the slurry and the activator

| Static Mixer Elements | Wet Density, pcf |
|---|---|
| 12 | 35.0 |
| 12 + 6 | 33.3 |
| 12 + 6 + 12 | 44.9 |

Example 5

Figure 10:
FIG. 10 shows material exiting a 15 foot long 1 inch diameter hose after the static mixer.
Figure 11:
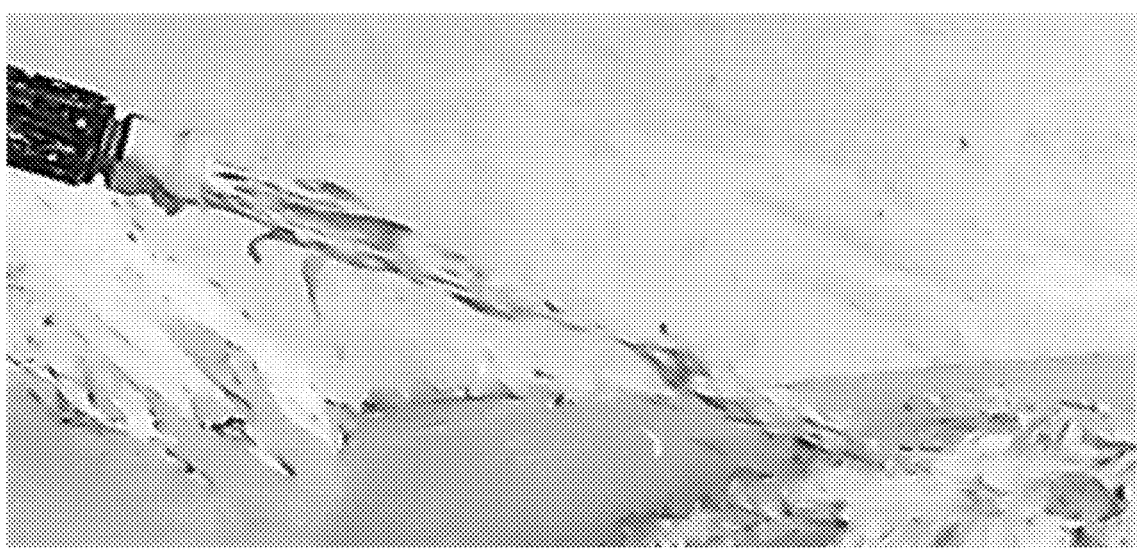
FIG. 11 shows material exiting a 25 foot long 1 inch diameter hose after the static mixer.

To show how the length of the third hose from FIG. 9 can alter the material exiting the hose the following setups were used and images were taken of the material exiting the hose. FIG. 10 shows material exiting a 15 ft long 1" diameter hose after the static mixer. The material is a partially expanded slurry but is still smooth and consistent looking. The increase in volume due to the reaction are beginning to show but are not the main factor of the flow. FIG. 11 shows material exiting a 25 ft long 1" diameter hose after the static mixer. The material has expanded in the hose and the gas has broken up the slurry into many globs of material. The material is also exiting the hose at a much faster rate due to the gas pressure caused by expansion.

The invention is not limited by the above provided embodiments but rather is defined by the claims appended hereto.

What is claimed is:

1. A method of making a foamed gypsum slurry having 15 to 90 volume percent gas bubbles, and wherein the method comprises:

passing a first slurry comprising water, 50 to 98 wt. % calcium sulfate hemihydrate on a dry basis, 1 to 50 wt. % calcium carbonate on a dry basis, and 0.1 to 10 wt. % cellulose thickener on a dry basis via a first hose to a Wye connector conduit at Rate C, wherein the first slurry has a residence time in the first hose of Time 2;

passing an alum solution comprising an aluminum compound via a second hose to the Wye connector conduit at Rate D;

passing the first slurry and the alum solution through respective inlet openings of the Wye connector conduit to combine in the Wye connector conduit to create a combined mixed stream that discharges from the Wye connector conduit through a discharge opening;

mixing the combined mixed stream in a static mixer for Time 3 to activate at least a portion of the calcium carbonate by reacting the portion of the calcium carbonate with the aluminum compound to generate $CO_2$ and create the foamed gypsum slurry;

transferring the foamed gypsum slurry from the static mixer to a cavity between two wall boards via a third hose, wherein the residence time in the third hose is Time 4; and allowing the foamed gypsum slurry in the cavity to expand, harden and dry.

2. The method of claim 1 further comprising:
adding a mixture comprising the calcium sulfate hemihydrate, the calcium carbonate, and the cellulose thickener to a mixing chamber at Rate A;
adding water to the mixing chamber at Rate B; and
mixing the mixture with water in the mixing chamber for Time 1 to form the first slurry.

3. The method of claim 2, wherein the mixture further comprises an accelerant, a retarder, and/or a chelating agent.

4. The method of claim 2, wherein Rate A is about 15 to about 60 lbs/min, Rate B is about 10 to about 40 lbs/min, Rate C is about 2 to about 10 gpm, Rate D is about 2 to about 15 lbs/min, Time 1 is about 20 to about 75 sec, Time 2 is about 22 to about 100 sec, Time 3 is about 0.005 to about 0.040 sec, and Time 4 is about 3 to about 15.

5. The method of claim 2, wherein Rate A is about 15 to about 25 lbs/min, Rate B is about 10 to about 20 lbs/min, Rate C is about 2 to about 4 gpm, Rate D is about 2 to about 5 lbs/min, Time 1 is about 45 to about 75 sec, Time 2 is about 50 to about 100 sec, Time 3 is about 0.020 to about 0.040 sec, and Time 4 is about 5 to about 15.

6. The method of claim 2, wherein Rate A is about 35 to about 60 lbs/min, Rate B is about 25 to about 40 lbs/min, Rate C is about 5 to about 10 gpm, Rate D is about 5 to about 15 lbs/min, Time 1 is about 20 to about 35 sec, Time 2 is about 22 to about 38 sec, Time 3 is about 0.005 to about 0.025 sec, and Time 4 is about 3 to about 10.

7. The method of claim 2, wherein the water to calcium sulfate hemihydrate weight ratio is 0.2-2:1 in addition to water of any optionally added latex aqueous medium.

8. The method of claim 2, wherein the mixture further comprises, based on 100 parts by weight of said ingredients of said mixture, at least one of:
0.1 to 1 wt. % chelating agent; and
0.05 to 1 wt. % biocide.

9. The method of claim 2, wherein the mixture further comprise, based on 100 parts by weight of said ingredients of said mixture, at least one additive selected from the group consisting of:
0.1 to 10 wt. % acrylate thickener selected from at least one member of the group consisting of sodium polyacrylates and water-soluble copolymers based on acrylic and (meth)acrylic acid;
0.1 to 10 wt. % casein, gum arabic, guar gum, tragacanth gum, starch, sodium alginate;
0.02 to 1 wt. % citric acid, tartaric acid, malic acid, acetic acid, boric acid;
0.02 to 2 wt. % alkali metal salt of citric acid;
0.02 to 2 wt. % accelerator, the accelerator selected from the group consisting of potassium sulfate, an organic phosphonic compound, a phosphate-containing compound, and a calcium sulfate dihydrate and sugar-containing composition;
0.1 to 5 wt. % foaming agent;
1 to 20 wt. % latex polymer;
0.01 to 1 wt. % 2-amino-2-methyl-1-propanol;
0.05 to 2 wt. % polycarboxylate ether dispersant;
0.05 to 2 wt. % polyphosphate;
0.01 to 2 wt. % naphthalene dispersant or lignosulfonate dispersant;
0.05 to 1 wt. % biocide;
0.01 to 0.5 wt. % silicon based defoamer;
1 to 5 wt. % inorganic particles selected from clay, pigment particles, and combinations thereof;
0.05 to 1% polyethylene oxide (PEO).

10. The method of claim 1, wherein the cellulose thickener is selected from at least one member of the group consisting of hydroxy propyl methyl cellulose, hydroxy ethyl methyl cellulose, hydroxy ethyl cellulose, methyl cellulose, methyl ethyl cellulose, ethyl cellulose, and carboxy methyl cellulose.

11. The method of claim 2, wherein the ingredients comprise, based on 100 parts by weight of said ingredients:
50 to 98 wt. % calcium sulfate hemihydrate;
1.5 to 50 wt. % calcium carbonate;
1.5 to 30 wt. % aluminum sulfate;
0 to 2 wt. % sodium citrate;
0 to 2 wt. % the accelerator comprising calcium sulfate dihydrate and sugar;
0.2 to 3 wt. %, cellulose thickener comprising hydroxy methyl propyl cellulose;
0-3 wt. % said foaming agent, wherein said foaming agent is selected from the group consisting of alkyl benzene sulfonate, fatty acid salts, sodium lauryl sulfate, alkyl sulfate salts, sodium lauryl ether sulfate, sodium alkyl ether sulfate, (sodium C14-16 olefin sulfonate, alpha-olefin sulfonates, phosphate esters, sulphosuccinates, alkyl phenol ether sulfates, and isethionates;
0 to 20 wt. % latex comprising surfactant and latex polymer dispersed as solids in aqueous medium, said latex polymer is selected from at least one member of the group consisting of acrylic polymer and styrene butadiene polymer;
0 to 1 wt. % 2-amino-2-methyl-1-propanol;
0 to 1 wt. % modifier comprising calcium hydroxide;
0.1 to 2 wt. % dispersant selected from at least one member of the group consisting of polycarboxylate dispersant, polyphosphate dispersant, and naphthalene dispersant,
wherein the polycarboxylate dispersant comprises a polycarboxylic ether dispersant,
wherein the naphthalene dispersant is selected from at least one of beta-naphthalene sulfonate, naphthalene sulfonate formaldehyde condensate and sodium naphthalene sulfate formaldehyde condensate,
wherein the polyphosphate dispersant is selected from at least one of the group sodium trimetaphosphate (STMP), sodium tripolyphosphate (STPP), potassium tripolyphosphate (KTPP), tetrasodium pyrophosphate (TSPP), tetrapotassium pyrophosphate, and tetrapotassium pyrophosphate (TKPP);
0 to 2 wt. % acrylate thickener selected from at least one member of the group consisting of sodium polyacrylate, acrylic acid/acrylamide and (meth)acrylic acid/acrylic ester copolymers;
0 to 1 wt. % chelating agent selected from
Diethylenetriaminepentaacetic acid (DTPA)
Ethylenediaminetetraacetic acid (EDTA)
Sodium polyacrylate
Polyphosphate, wherein if the polyphosphate is also present as a dispersant the polyphosphate present as a chelating agent is in addition to the polyphosphate present as a dispersant;
0 to 0.5 wt. % silicon based defoamer;
0 to 5 wt. % inorganic particles selected from clay, pigment particles, and combinations thereof;
0-10% wt. % of lightweight aggregate.

12. The method of claim 1, wherein the aluminum compound is selected from aluminum sulfate and potassium aluminum sulfate.

13. The method of claim 1, wherein the aluminum compound comprises particles of powder encapsulated in a shell for a controlled release of the powder when adequate shear force is applied to the particles of powder encapsulated particles in the shell in the slurry during the mixing process.

14. The method of claim 1, wherein the aluminum compound comprises particles coated with a water soluble coating.

15. The method of claim 2, wherein the mixture further comprise lightweight aggregate selected from at least one of perlite and polystyrene.

16. The method of claim 1, wherein the foamed gypsum slurry has a density of about 10 pcf to about 80 pcf.

17. The method of claim 1, wherein the foamed gypsum slurry is a first foamed gypsum slurry, and wherein the cavity is filled with the first foamed gypsum slurry to a first fill vertical distance within the cavity of about 6 inches to about 10 feet;

wherein the first foamed gypsum slurry in the cavity is allowed to expand and gain significant green strength to create a green foamed gypsum product;

making a second foamed gypsum slurry having 15 to 90 volume percent gas bubbles, wherein the making of the second foamed gypsum slurry comprises:

passing a second slurry comprising water, 50 to 98 wt. % calcium sulfate hemihydrate on a dry basis, 1 to 50 wt. % calcium carbonate on a dry basis, and 0.1 to 10 wt. % cellulose thickener on a dry basis via a second slurry first hose to a second slurry Wye connector conduit at a second Rate C, wherein the second slurry has a residence time in the second slurry first hose of a second Time 2;

passing a second alum solution comprising an aluminum compound via a second alum solution second hose to the second slurry Wye connector conduit at a second Rate D;

passing the second gypsum slurry and the second alum solution through respective inlet openings of the second slurry Wye connector conduit to combine in the second slurry Wye connector conduit to create a second combined mixed stream that discharges from the second slurry Wye connector conduit through a second slurry Wye connector conduit discharge opening;

mixing the second combined mixed stream in a static mixer for second Time 3 to activate at least a portion of the calcium carbonate by reacting the portion of the calcium carbonate with the aluminum compound to generate $CO_2$ and create the second foamed gypsum slurry; and transferring the second foamed gypsum slurry from the static mixer to the cavity between two wall boards via the third hose, wherein the residence time in the third hose is a second Time 4 to fill the cavity with the second foamed gypsum slurry on top of the green foamed gypsum product to a second fill vertical distance within the cavity of about 6 inches to about 10 feet;

wherein the cavity is filled with the second foamed gypsum slurry on top of the green foamed gypsum product to a second fill vertical distance within the cavity of about 6 inches to about 10 feet; and allowing the second foamed gypsum slurry in the cavity to expand, harden and dry.

18. The method of claim 17, wherein the cavity comprises a wall at least partially formed by wallboard.

19. The method of claim 18, wherein the wallboard is attached to a formwork such that when the cavity is filled the formwork is not in contact with the first or second foamed gypsum slurry.

* * * * *